(12) United States Patent
Dou et al.

(10) Patent No.: US 11,121,406 B2
(45) Date of Patent: *Sep. 14, 2021

(54) ELECTROLYTE AND BATTERY

(71) Applicant: Contemporary Amperex Technology Co., Limited, Ningde (CN)

(72) Inventors: Shushi Dou, Ningde (CN); Chunhua Hu, Ningde (CN); Tiancheng Yi, Ningde (CN); Zijun Xu, Ningde (CN); Chengdu Liang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 143 days.

This patent is subject to a terminal disclaimer.

(21) Appl. No.: 16/357,549

(22) Filed: Mar. 19, 2019

(65) Prior Publication Data

US 2019/0326641 A1 Oct. 24, 2019

(30) Foreign Application Priority Data

Apr. 20, 2018 (CN) .......................... 201810361190.8

(51) Int. Cl.
*H01M 10/0567* (2010.01)
*H01M 10/0525* (2010.01)
*H01M 10/0568* (2010.01)
*H01M 10/0569* (2010.01)

(52) U.S. Cl.
CPC ... *H01M 10/0567* (2013.01); *H01M 10/0525* (2013.01); *H01M 10/0568* (2013.01); *H01M 10/0569* (2013.01); H01M 2300/004 (2013.01)

(58) Field of Classification Search
None
See application file for complete search history.

(56) References Cited

U.S. PATENT DOCUMENTS

2015/0064578 A1   3/2015   Kang et al.

FOREIGN PATENT DOCUMENTS

| CN | 101160684 A | 4/2008 |
|----|-------------|--------|
| CN | 104900916 A1 | 9/2015 |
| CN | 105826608 A | 8/2016 |
| CN | 107331893 A | 11/2017 |
| EP | 3442071 A1 | 2/2019 |
| JP | 2001357877 A | 12/2001 |
| JP | 2003007333 A | 1/2003 |
| JP | 2010044883 A | 2/2010 |
| JP | 2014209479 A | 11/2014 |
| WO | 2017185703 A1 | 11/2017 |
| WO | WO 2018/227689 | * 12/2019 |

OTHER PUBLICATIONS

The extended European Search Report for European Application No. 19164764.3, dated Jul. 24, 2019, 5 pages.
The First Office Action and search report dated May 7, 2020 for Chinese Application No. 201810361190.8, 9 pages.
The Official Action and search report dated Feb. 17, 2020 for Japanese application No. 2019-055825, 2 pages.
Notice of Allowance for Japanese Patent Application No. 2019-055825, dated Sep. 28, 2020, 5 pages.

* cited by examiner

*Primary Examiner* — Laura Weiner
(74) *Attorney, Agent, or Firm* — Law Offices of Liaoteng Wang

(57) ABSTRACT

This application provides an electrolyte and a battery. The electrolyte comprises an electrolytic salt and an organic solvent comprising a cyclic carbonate and a chain carbonate. The electrolyte further comprises an additive A and an additive B, wherein the additive A is a positive-electrode film-forming additive, the additive B is a negative-electrode film-forming additive, and the reduction potential of the additive B is higher than that of the cyclic carbonate, and the electrolyte has a conductivity of 6 mS/cm to 10 mS/cm at 25° C. The electrolyte of the present application can improve the cycle performance and storage performance of the battery, in particular, improve the cycle performance and storage performance of the battery under high temperature and high voltage conditions, and at the same time balance the low-temperature performance of the battery.

9 Claims, 1 Drawing Sheet

ELECTROLYTE AND BATTERY

CROSS-REFERENCE TO RELATED APPLICATION

Figure 1:
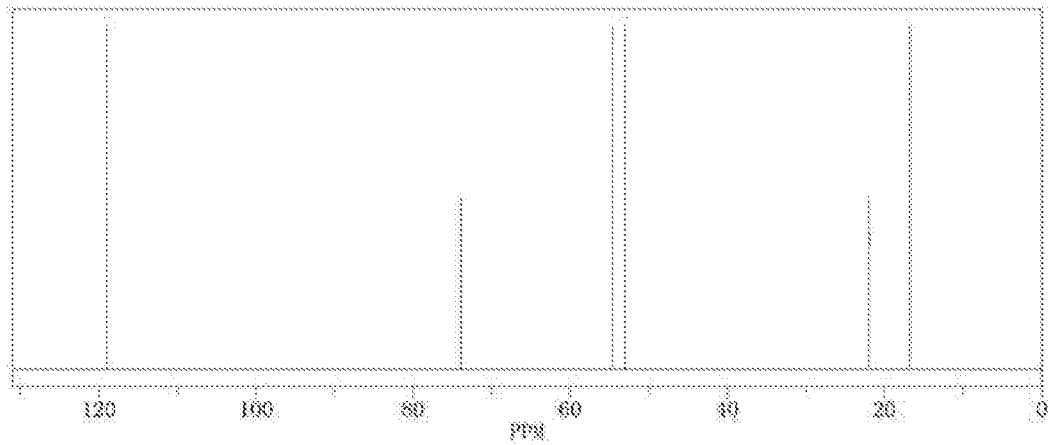

This application is based on and claims priority to Chinese Patent Application No. 201810361190.8 filed on Apr. 20, 2018, which is incorporated herein by reference in its entirety.

TECHNICAL FIELD

The present application relates to the field of energy storage materials, and in particular to an electrolyte and a battery.

BACKGROUND

Lithium-ion batteries are widely used in electric vehicles and consumer electronics because of their high energy density, high output power, long cycle life and small environmental pollution. The current demand for lithium-ion batteries is: high voltage, high power, long cycle life, long storage life and excellent safety performance.

Currently, the electrolyte system in which lithium hexafluorophosphate is used as a conductive lithium salt and a cyclic carbonate and/or a chain carbonate is used as an organic solvent is widely used for lithium-ion batteries. However, the above electrolyte system still has many deficiencies. For example, under high voltage and high temperature conditions, the cycle performance and storage performance of the above electrolyte system need to be improved.

In view of this, the present application is specifically filed.

SUMMARY

In view of the problems in the prior art, the purpose of the present application is to provide an electrolyte and a battery, which can improve the cycle performance and storage performance of the battery, especially the cycle performance and storage performance of the battery under high temperature and high voltage conditions, while also balancing the low-temperature performance of the battery.

In order to achieve the above object, in a first aspect of the present application, the present application provides an electrolyte comprising an electrolytic salt and an organic solvent comprising a cyclic carbonate and a chain carbonate. The electrolyte further comprises an additive A and an additive B, wherein the additive A is a positive-electrode film-forming additive, the additive B is a negative-electrode film-forming additive, and the reduction potential of the additive B is higher than that of the cyclic carbonate, and the electrolyte has a conductivity of 6 mS/cm to 10 mS/cm at 25° C.; wherein the additive A is selected from one or more of the compounds represented by Formula I-1, Formula I-2 and Formula I-3. In Formula I-1, Formula I-2, Formula I-3: $R_1$, $R_2$, $R_3$, $R_4$ are each independently selected from a hydrogen atom, a halogen atom, a substituted or unsubstituted $C_1$-$C_{12}$ alkyl group, a substituted or unsubstituted $C_1$-$C_{12}$ alkoxy group, a substituted or unsubstituted $C_1$-$C_{12}$ amino group, a substituted or unsubstituted $C_2$-$C_{12}$ alkenyl group, a substituted or unsubstituted $C_2$-$C_{12}$ alkynyl group, a substituted or unsubstituted $C_6$-$C_{26}$ aryl group, and a substituted or unsubstituted $C_2$-$C_{12}$ heterocyclic group, wherein the substituent is selected from one or more of a halogen atom, a cyano group, a $C_1$-$C_6$ alkyl group, a $C_2$-$C_6$ alkenyl group, and a $C_1$-$C_6$ alkoxy group; wherein x, y, and z are each independently selected from an integer of 0 to 8; m, n, and k are each independently selected from an integer of 0 to 2.

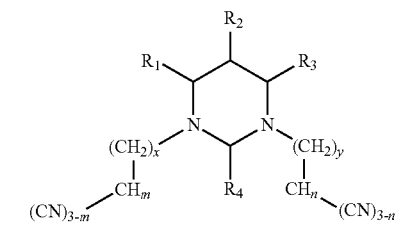

Formula I-1

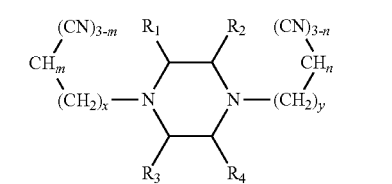

Formula I-2

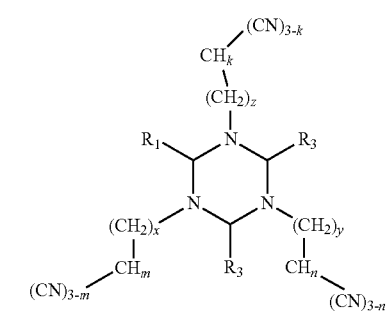

Formula I-3

In a second aspect of the present application, the present application provides a battery comprising a positive electrode plate, a negative electrode plate, a separator disposed between the positive electrode plate and the negative electrode plate, and the electrolyte according to the first aspect of the present application.

The technical solution of the present application has at least the following beneficial effects:

By adding a nitrogen-containing six-membered heterocyclic compound with more than one cyano group as a positive-electrode film-forming additive in the electrolyte of the present application, the surface of positive active materials can be effectively passivated, the surface activity of positive active materials can be suppressed, the oxidation effect of the positive active materials on the electrolyte can be suppressed, and the battery-storage gas production can be reduced while reducing side reactions; in addition, with a suitable negative-electrode film-forming additive, it is preferred to form a uniform and dense SEI film on the surface of the negative electrode, so that the above positive-electrode film-forming additive and the negative-electrode film-forming additive can synergistically improve the electrochemical performance of the battery under high temperature and high pressure to a greater extent; furthermore, when the organic solvent of the electrolyte of the present application comprises a cyclic carbonate and a chain carbonate and the conductivity of the electrolyte of the present application at 25° C. satisfies 6 mS/cm~10 mS/cm, the film forming effect of the above positive-electrode film-forming additive and the negative-electrode film-forming additive is good, and the electrolyte can be ensured to have good low-temperature performance and high-temperature performance.

DRAWINGS

Figure 2:
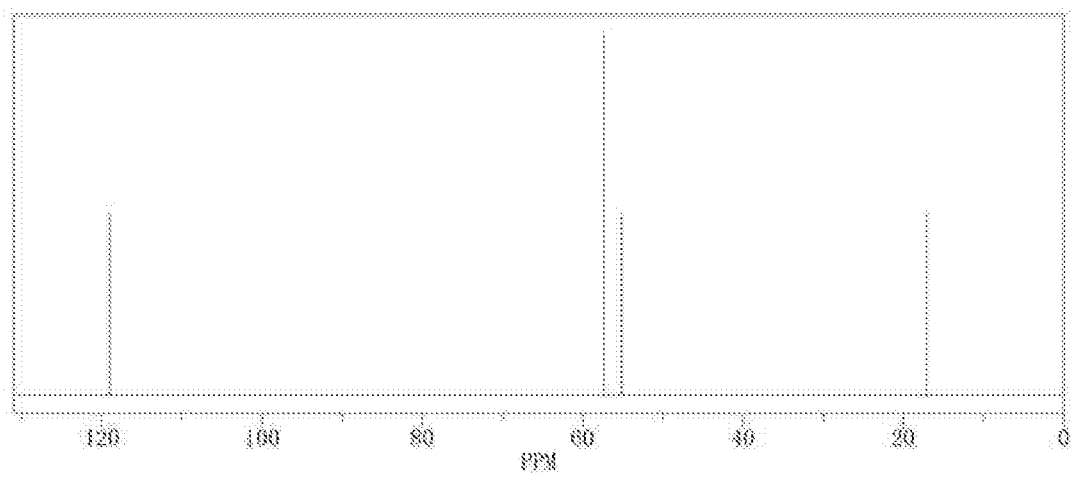
Figure 3:
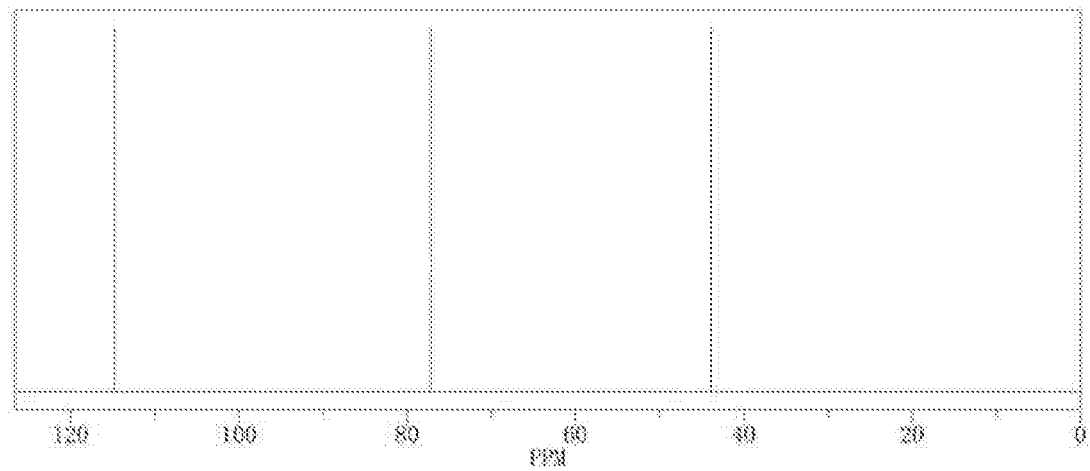

FIG. 1 is $C^{13}$ NMR spectrum of A1 compound.
FIG. 2 is $C^{13}$ NMR spectrum of A2 compound.
FIG. 3 is $C^{13}$ NMR spectrum of A3 compound.

DETAILED DESCRIPTION

The electrolyte and battery according to the present application will be described in detail below.

First, the electrolyte according to the first aspect of the present application will be explained.

The electrolyte according to the first aspect of the present application comprises an electrolytic salt and an organic solvent comprising a cyclic carbonate and a chain carbonate. The electrolyte further comprises an additive A and an additive B, wherein the additive A is a positive-electrode film-forming additive, the additive B is a negative-electrode film-forming additive, and the reduction potential of the additive B is higher than that of the cyclic carbonate, and the electrolyte has a conductivity of 6 mS/cm to 10 mS/cm at 25° C.

The additive A is selected from one or more of the compounds represented by Formula I-1, Formula I-2, and Formula I-3. In Formula I-1, Formula I-2, Formula I-3: $R_1$, $R_2$, $R_3$, $R_4$ are each independently selected from a hydrogen atom, a halogen atom, a substituted or unsubstituted $C_1$-$C_{12}$ alkyl group, a substituted or unsubstituted $C_1$-$C_{12}$ alkoxy group, a substituted or unsubstituted $C_1$-$C_{12}$ amino group, a substituted or unsubstituted $C_2$-$C_{12}$ alkenyl group, a substituted or unsubstituted $C_2$-$C_{12}$ alkynyl group, a substituted or unsubstituted $C_6$-$C_{26}$ aryl group, and a substituted or unsubstituted $C_2$-$C_{12}$ heterocyclic group, wherein the substituent (in the case where a substitution occurs in "substituted or unsubstituted") is selected from one or more of a halogen atom, a cyano group, a $C_1$-$C_6$ alkyl group, a $C_2$-$C_6$ alkenyl group, and a $C_1$-$C_6$ alkoxy group; wherein x, y, and z are each independently selected from an integer of 0 to 8; m, n, and k are each independently selected from an integer of 0 to 2. In $R_1$, $R_2$, $R_3$, and $R_4$, the alkyl group, the alkenyl group, and the alkynyl group may be a chain structure or a cyclic structure, and the chain structure is further divided into a linear structure and a branched structure; and the halogen atom may be selected from one or more of a fluorine atom, a chlorine atom, and a bromine atom, preferably, a fluorine atom.

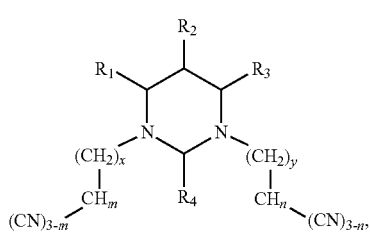

Formula I-1

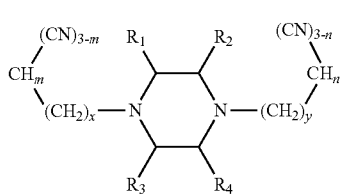

Formula I-2

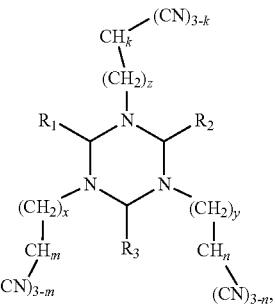

Formula I-3

In the electrolyte of the first aspect of the present application, the additive A is a nitrogen-containing six-membered heterocyclic compound with more than one cyano group, and the lone pair electrons contained in the nitrogen atom of the cyano group and the 3d empty orbit of the transition metal may have strong complexation. Therefore, when it is applied to the electrolyte, it can be adsorbed on the surface of positive active materials to form a loose porous protective film, which can effectively passivate the surface of positive active materials, and isolate the surface of positive active materials from directly contacting with the electrolyte without affecting the normal transportation of ions, thus reduce the surface activity of the positive active material while inhibiting the oxidation effect thereof on the electrolyte, avoid a large number of side reactions on the surface of positive active materials, thereby reducing side products and reducing the gas production. In addition, the nitrogen-containing six-membered heterocyclic compound with more than one cyano group has a special nitrogen-containing six-membered heterocyclic structure, such that the distance between the cyano groups is closer to the distance between the transition metals on the surface of positive active materials, and the complexation of the cyano group can be maximized, a larger amount of cyano groups can play the role of complexation to enhance the surface passivation effect of positive active materials. The special nitrogen-containing six-membered heterocyclic structure can also affect the film-formation potential of the cyano group and the film-forming effect on the surface of positive active materials etc., which further improves the electrochemical performance of the entire battery system, such as reducing storage gas production, improving high-temperature and high-pressure cycle performance, and the like. At the same time, the nitrogen-containing six-membered heterocyclic compound with more than one cyano group can improve the conductivity of the electrolyte to some extent and improve the dynamic performance of the battery, so it also has a certain improvement effect on the low-temperature performance of the lithium-ion battery.

In the electrolyte according to the first aspect of the present application, the additive B is a negative-electrode film-forming additive, and the reduction potential of the additive B is higher than that of the cyclic carbonate, which means that the reduction reaction of the additive B occurs in the negative electrode prior to the organic solvent (especially the cyclic carbonate) during the charge and discharge process of the battery. When used in combination with the additive A, a uniform and dense SEI film can be formed on the surface of the negative electrode, which effectively isolating other components in the electrolyte from contacting the negative electrons and inhibits the side reaction of the negative electrode, thereby further improving the high-temperature and high-pressure cycle performance of the battery. At the same time, since the effect of the additive A on protecting the positive electrode to reduce the gas production still exists, the storage performance of the battery is not significantly affected.

In the electrolyte according to the first aspect of the present application, the electrolyte has a conductivity of 6 mS/cm to 10 mS/cm at 25° C. When the conductivity of the electrolyte is too small, the kinetic performance of the electrolyte is poor, and the low-temperature performance of the battery is poor, and the viscosity of the electrolyte is large, which also affects the adsorption film formation effect of the additive A on the surface of the positive electrode, and also affects the film-forming effect of the additive B on the surface of the negative electrode to form an SEI film. When the conductivity of the electrolyte is too large, the thermal stability of the electrolyte is poor, and the high-temperature performance of the battery is poor.

In the electrolyte according to the first aspect of the present application, if the content of the additive A is too low, the effect on improving the electrolyte is not significant, and if the content of the additive A is too high, the complex layer formed on the surface of the positive active material by the absorption of the additive A has a too large thickness, then the positive electrode impedance is greatly increased, which deteriorates the performance of the battery system. Preferably, the mass percentage of the additive A may be from 0.1% to 3.5% based on the total mass of the electrolyte.

In the electrolyte according to the first aspect of the present application, in the compounds of Formula I-1, Formula I-2, and Formula I-3:

The $C_1$-$C_{12}$ alkyl group may be a chain alkyl group or a cyclic alkyl group, and the chain alkyl group may be a linear alkyl group or a branched alkyl group, and the hydrogen located on the ring of the cyclic alkyl group may be further substituted by an alkyl group. The lower limit of the number of carbon atoms in the $C_1$-$C_{12}$ alkyl group is preferably 1, 2, 3, 4, and 5, and the upper limit is preferably 3, 4, 5, 6, 8, 10, and 12. Preferably, a $C_1$-$C_{10}$ alkyl group is used; more preferably, a $C_1$-$C_6$ chain alkyl group or a $C_3$-$C_8$ cyclic alkyl group is used; and still more preferably, a $C_1$-$C_4$ chain alkyl group or a $C_5$-$C_7$ cyclic alkyl group is used. Specific examples of the $C_1$-$C_{12}$ alkyl group include methyl, ethyl, n-propyl, isopropyl, n-butyl, isobutyl, sec-butyl, tert-butyl, n-pentyl, isopentyl, neopentyl, hexyl, 2-methyl-pentyl, 3-methyl-pentyl, 1,1,2-trimethyl-propyl, 3,3-dimethyl-butyl, heptyl, 2-heptyl, 3-heptyl, 2-methylhexyl, 3-methylhexyl, isoheptyl, octyl, nonyl and decyl.

In the case that the above-mentioned $C_1$-$C_{12}$ alkyl group contains an oxygen atom, it may be a $C_1$-$C_{12}$ alkoxy group. Preferably, a $C_1$-$C_{10}$ alkoxy group is used; further preferably, a $C_1$-$C_6$ alkoxy group is used; and still more preferably, a $C_1$-$C_4$ alkoxy group is used. Specific examples of the $C_1$-$C_{12}$ alkoxy group include methoxy group, ethoxy group, n-propoxy group, isopropoxy group, n-butoxy group, sec-butoxy group, tert-butoxy group, n-pentyloxy group, isopentyloxy group, cyclopentyloxy group and cyclohexyloxy group.

The $C_2$-$C_{12}$ alkenyl group may be a cyclic alkenyl group or a chain alkenyl group, and the chain alkenyl group may be a linear alkenyl group or a branched alkenyl group. Further, the number of double bonds in the $C_2$-$C_{12}$ alkenyl group is preferably one. The lower limit of the number of carbon atoms in the $C_2$-$C_{12}$ alkenyl group is preferably 2, 3, 4, and 5, and the upper limit is preferably 3, 4, 5, 6, 8, 10, and 12. Preferably, a $C_2$-$C_{10}$ alkenyl group is used; further preferably, a $C_2$-$C_6$ alkenyl group is used; and still more preferably, a $C_2$-$C_5$ alkenyl group is used. Specific examples of the $C_2$-$C_{12}$ alkenyl group include vinyl, allyl, isopropenyl, pentenyl, cyclohexenyl, cycloheptenyl, and cyclooctenyl.

The $C_2$-$C_{12}$ alkynyl group may be a cyclic alkynyl group or a chain alkynyl group, and the chain alkynyl group may be a linear alkynyl group or a branched alkynyl group. Further, the number of the triple bonds in the $C_2$-$C_{12}$ alkynyl groups is preferably one. The lower limit of the number of carbon atoms in the $C_2$-$C_{12}$ alkynyl group is preferably 2, 3, 4, and 5, and the upper limit is preferably 3, 4, 5, 6, 8, 10, and 12. Preferably, a $C_2$-$C_{10}$ alkynyl group is used; further preferably, a $C_2$-$C_6$ alkynyl group is used; and still more preferably, a $C_2$-$C_5$ alkynyl group is used. Specific examples of the $C_2$-$C_{12}$ alkynyl group include ethynyl, propargyl, isopropynyl, pentynyl, cyclohexynyl, cycloheptynyl, and cyclooctynyl.

The $C_1$-$C_{12}$ amino group may be selected from

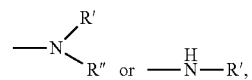

wherein R' and R" are selected from a $C_1$-$C_{12}$ alkyl group.

The $C_6$-$C_{26}$ aryl group may be a phenyl group, a phenyl-alkyl group, a biphenyl group, a fused polycyclic aromatic hydrocarbyl group (for example, a naphthyl group, an anthracenyl group, a phenanthryl group), wherein the biphenyl group and the fused polycyclic aromatic hydrocarbyl group may be further substituted by an alkyl or alkenyl group. Preferably, a $C_6$-$C_{16}$ aryl group is used; further preferably, a $C_6$-$C_{14}$ aryl group is used; and still more preferably, a $C_6$-$C_9$ aryl group is used. Specific examples of the $C_6$-$C_{26}$ aryl group include phenyl, benzyl, biphenyl, p-methylphenyl, o-methylphenyl, m-methylphenyl, naphthyl, anthracenyl, and phenanthryl.

The hetero atom in the $C_2$-$C_{12}$ heterocyclic group may be selected from one or more of oxygen, nitrogen, sulfur, phosphorus, and boron, and the heterocyclic ring may be an aliphatic or aromatic heterocyclic ring. Preferably, a $C_2$-$C_{10}$ heterocyclic group is used; further preferably, a $C_2$-$C_7$ heterocyclic group is used; and still more preferably, a five-membered aromatic heterocyclic ring, a six-membered aromatic heterocyclic ring, or a benzoheterocyclic ring is used. Specific examples of the $C_2$-$C_{12}$ heterocyclic group include oxiranyl, oxetanyl, thiaranyl, aziridinyl, β-propiolactone, furanyl, thiophenyl, pyrrolyl, thiazolyl, imidazolyl, pyridinyl, pyrazinyl, pyrimidinyl, pyridazinyl, indolyl and quinolinyl.

(1) Specifically, the compound represented by Formula I-1 is a pyrimidine compound containing more than one cyano group.

In Formula I-1, it is preferred that $R_1$, $R_2$, $R_3$ and $R_4$ are each independently selected from a hydrogen atom, a fluorine atom, a chlorine atom, a bromine atom, a substituted or unsubstituted $C_1$-$C_6$ linear or branched alkyl group, a substituted or unsubstituted $C_5$-$C_9$ cyclic alkyl group, a substituted or unsubstituted $C_1$-$C_6$ alkoxy group, a substituted or unsubstituted $C_1$-$C_6$ amino group, a substituted or unsubstituted $C_2$-$C_6$ alkenyl group, a substituted or unsubstituted $C_2$-$C_6$ alkynyl group, a substituted or unsubstituted $C_6$-$C_{12}$ aryl group, and a substituted or unsubstituted $C_2$-$C_{12}$ heterocyclic group, wherein the substituent may be selected from one or more of halogen atoms. It is further preferred that $R_1$, $R_2$, $R_3$ and $R_4$ are each independently selected from a hydrogen atom, a fluorine atom, a chlorine atom, a bromine atom, a substituted or unsubstituted $C_1$-$C_3$ linear or branched alkyl group, a substituted or unsubstituted $C_5$-$C_7$ cyclic alkyl group, a substituted or unsubstituted $C_1$-$C_3$ alkoxy group, a substituted or unsubstituted $C_1$-$C_3$ amino group, a substituted or unsubstituted $C_2$-$C_3$ alkenyl group, a substituted or unsubstituted $C_2$-$C_3$ alkynyl group, a substituted or unsubstituted $C_6$-$C_8$ aryl group, and a substituted or unsubstituted $C_2$-$C_7$ heterocyclic group, wherein the substituent may be selected from one or more of halogen atoms.

In Formula I-1, x is preferably selected from an integer of 0 to 6, further preferably selected from an integer of 0 to 4, more preferably selected from 1 or 2.

In Formula I-1, y is preferably selected from an integer of 0 to 6, further preferably selected from an integer of 0 to 4, more preferably selected from 1 or 2.

In Formula I-1, it is preferred that $R_1$ and $R_3$ are the same group; further preferably, $R_1$, $R_3$ and $R_4$ are all the same group.

In Formula I-1, it is preferred that $R_1$ and $R_3$ are each a hydrogen atom; it is further preferred that $R_1$, $R_3$ and $R_4$ are each a hydrogen atom; still more preferably, $R_1$, $R_2$, $R_3$ and R4 are each a hydrogen atom, or $R_1$, $R_3$ and $R_4$ are each a hydrogen atom, and $R_2$ is selected from a fluorine atom, a chlorine atom, a bromine atom, a substituted or unsubstituted $C_1$-$C_6$ linear or branched alkyl group, or a substituted or unsubstituted $C_1$-$C_6$ alkoxy group, wherein the substituent is selected from one or more of halogen atoms, and preferably, the substituent is selected from a fluorine atom.

Preferably, the compound represented by Formula I-1 may be specifically selected from one or more of the following compounds, but t not limited thereto:

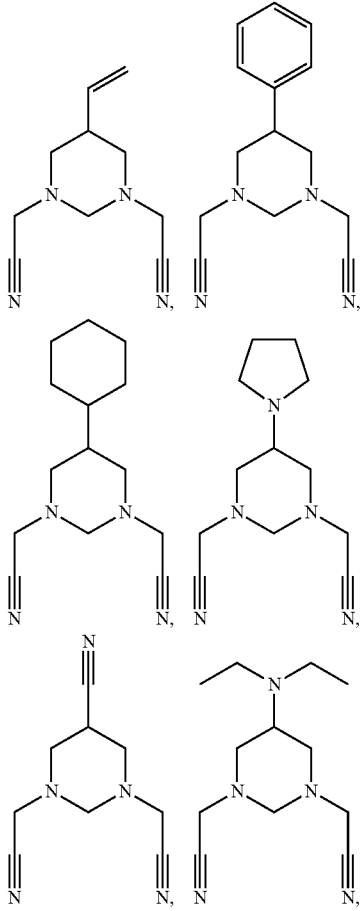

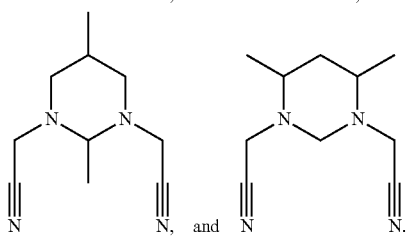

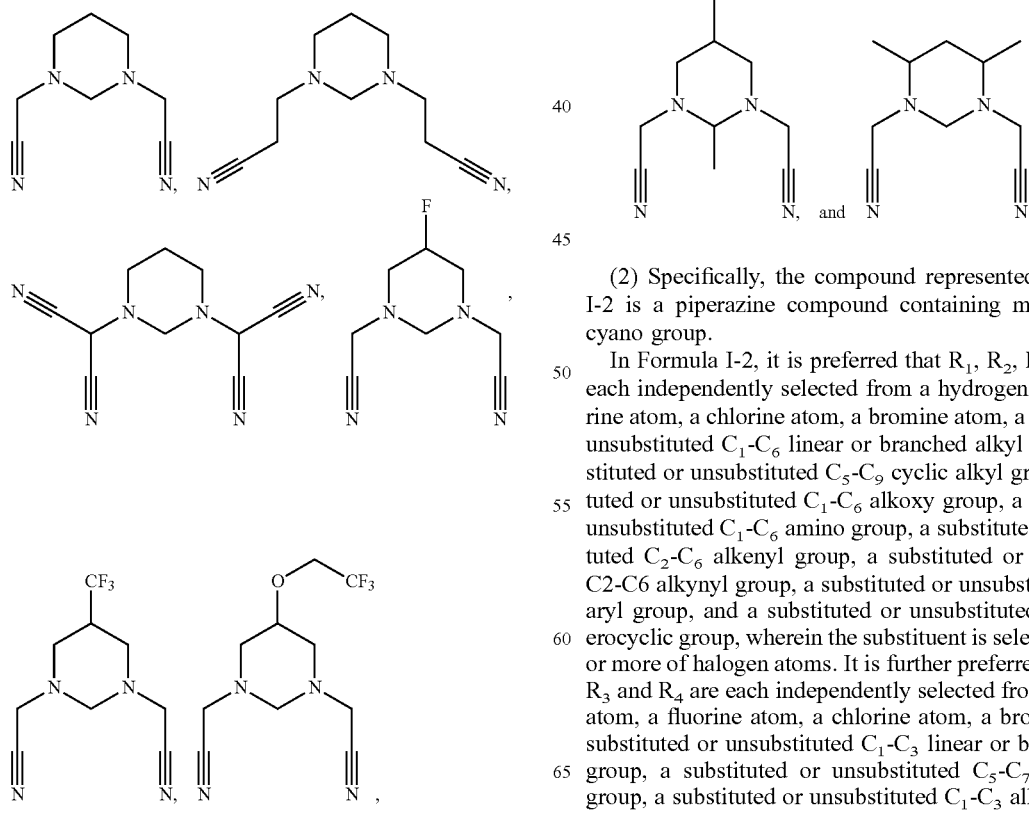

(2) Specifically, the compound represented by Formula I-2 is a piperazine compound containing more than one cyano group.

In Formula I-2, it is preferred that $R_1$, $R_2$, $R_3$ and $R_4$ are each independently selected from a hydrogen atom, a fluorine atom, a chlorine atom, a bromine atom, a substituted or unsubstituted $C_1$-$C_6$ linear or branched alkyl group, a substituted or unsubstituted $C_5$-$C_9$ cyclic alkyl group, a substituted or unsubstituted $C_1$-$C_6$ alkoxy group, a substituted or unsubstituted $C_1$-$C_6$ amino group, a substituted or unsubstituted $C_2$-$C_6$ alkenyl group, a substituted or unsubstituted C2-C6 alkynyl group, a substituted or unsubstituted $C_6$-$C_{12}$ aryl group, and a substituted or unsubstituted $C_2$-$C_{12}$ heterocyclic group, wherein the substituent is selected from one or more of halogen atoms. It is further preferred that $R_1$, $R_2$, $R_3$ and $R_4$ are each independently selected from a hydrogen atom, a fluorine atom, a chlorine atom, a bromine atom, a substituted or unsubstituted $C_1$-$C_3$ linear or branched alkyl group, a substituted or unsubstituted $C_5$-$C_7$ cyclic alkyl group, a substituted or unsubstituted $C_1$-$C_3$ alkoxy group, a substituted or unsubstituted $C_1$-$C_3$ amino group, a substituted or unsubstituted $C_2$-$C_3$ alkenyl group, a substituted or unsubstituted $C_2$-$C_3$ alkynyl group, a substituted or unsubstituted $C_6$-$C_8$ aryl group, and a substituted or unsubstituted $C_2$-$C_7$ heterocyclic group, wherein the substituent is selected from one or more of halogen atoms.

In Formula I-2, x is preferably selected from an integer of 0 to 6, further preferably selected from an integer of 0 to 4, more preferably selected from 1 or 2.

In Formula I-2, y is preferably selected from an integer of 0 to 6, further preferably selected from an integer of 0 to 4, more preferably selected from 1 or 2.

In Formula I-2, it is preferred that at least two of $R_1$, $R_2$, $R_3$ and $R_4$ are the same group, and it is further preferred that at least three of $R_1$, $R_2$, $R_3$ and $R_4$ are the same group.

In Formula I-2, it is preferred that at least two of $R_1$, $R_2$, $R_3$ and $R_4$ are a hydrogen atom; it is further preferred that at least three of $R_1$, $R_2$, $R_3$ and $R_4$ are a hydrogen atom; it is still more preferred that $R_1$, $R_2$, $R_3$ and $R_4$ are each a hydrogen atom, or three of $R_1$, $R_2$, $R_3$ and $R_4$ are a hydrogen atom, and the remaining one is selected from a fluorine atom, a chlorine atom, a bromine atom, a substituted or unsubstituted $C_1$-$C_6$ linear or branched alkyl group, and a substituted or unsubstituted $C_1$-$C_6$ alkoxy group, wherein the substituent is selected from one or more of halogen atoms, and preferably, the substituent is selected from a fluorine atom.

Preferably, the compound of Formula I-2 may be specifically selected from one or more of the following compounds, but not limited thereto:

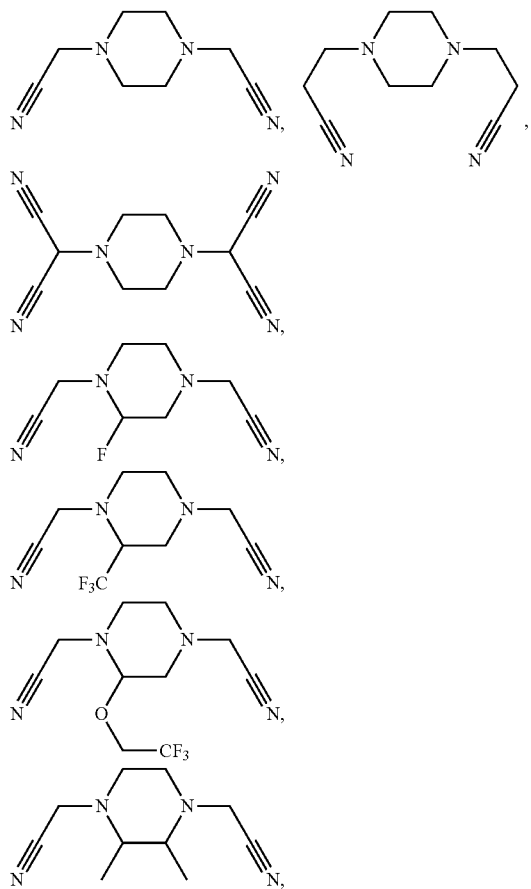

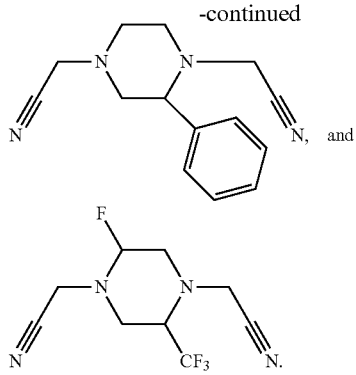

(3) Specifically, the compound represented by Formula I-3 is a s-triazine compound containing more than one cyano groups.

In Formula I-3, it is preferred that $R_1$, $R_2$ and $R_3$ are each independently selected from a hydrogen atom, a fluorine atom, a chlorine atom, a bromine atom, a substituted or unsubstituted $C_1$-$C_6$ linear or branched alkyl group, a substituted or unsubstituted $C_5$-$C_9$ cyclic alkyl group, a substituted or unsubstituted $C_1$-$C_6$ alkoxy group, a substituted or unsubstituted $C_1$-$C_6$ amino group, a substituted or unsubstituted $C_2$-$C_6$ alkenyl group, a substituted or unsubstituted $C_2$-$C_6$ alkynyl group, a substituted or unsubstituted $C_6$-$C_{12}$ aryl group, and a substituted or unsubstituted $C_2$-$C_{12}$ heterocyclic group, wherein the substituent is selected from one or more of the halogen atoms. It is further preferred that $R_1$, $R_2$ and $R_3$ are each independently selected from a hydrogen atom, a fluorine atom, a chlorine atom, a bromine atom, a substituted or unsubstituted $C_1$-$C_3$ linear or branched alkyl group, a substituted or unsubstituted $C_5$-$C_7$ cyclic alkyl group, a substituted or unsubstituted $C_1$-$C_3$ alkoxy group, a substituted or unsubstituted $C_1$-$C_3$ amino group, a substituted or unsubstituted $C_2$-$C_3$ alkenyl group, a substituted or unsubstituted $C_2$-$C_3$ alkynyl group, a substituted or unsubstituted $C_6$-$C_8$ aryl group, and a substituted or unsubstituted $C_2$-$C_7$ heterocyclic group, wherein the substituent is selected from one or more of halogen atoms.

In Formula I-3, x is preferably selected from an integer of 0 to 6, further preferably selected from an integer of 0 to 4, more preferably selected from 1 or 2.

In Formula I-3, y is preferably selected from an integer of 0 to 6, further preferably selected from an integer of 0 to 4, more preferably selected from 1 or 2.

In Formula I-3, it is preferred that at least two of $R_1$, $R_2$ and $R_3$ are the same group.

In Formula I-3, it is preferred that at least two of $R_1$, $R_2$, and $R_3$ are hydrogen atoms; it is further preferred that $R_1$, $R_2$ and $R_3$ are each a hydrogen atom, or two of $R_1$, $R_2$ and $R_3$ are a hydrogen atom, and the remaining one is selected from a fluorine atom, a chlorine atom, a bromine atom, a substituted or unsubstituted $C_1$-$C_6$ linear or branched alkyl group, and a substituted or unsubstituted $C_1$-$C_6$ alkoxy group, wherein the substituent is selected from one or more of halogen atoms, preferably, the substituent is selected from a fluorine atom.

Preferably, the compound represented by Formula I-3 may be specifically selected from one or more of the following compounds, but not limited thereto:

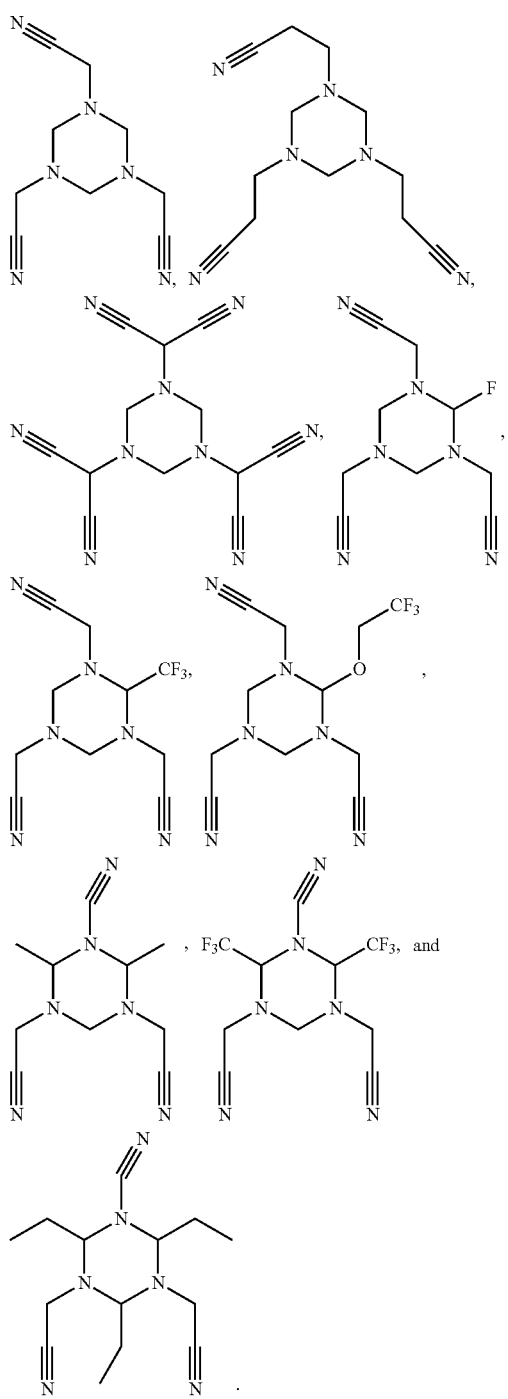

In the electrolyte of the first aspect of the present application, the reduction potential of the additive B is higher than that of the cyclic carbonate, so that the additive B can preferentially form a film on the surface of the negative electrode.

The additive B may be selected from one or more of a cyclic carbonate compound containing a carbon-carbon unsaturated bond, a halogen-substituted cyclic carbonate compound, a sulfate compound, a sulfite compound, a sultone compound, a disulfonate compound, a nitrile compound, an aromatic compound, an isocyanate compound, a phosphazene compound, an acid anhydride compound, a phosphite compound, a phosphate compound, and a borate compound.

The mass percentage of the additive B in the electrolyte is 0.1% to 10% based on the total mass of the electrolyte.

(a) Cyclic Carbonate Compound Containing a Carbon-Carbon Unsaturated Bond

The cyclic carbonate compound containing a carbon-carbon unsaturated bond may be selected from one or more of the compounds represented by Formula II-0. In Formula II-0, $R_{20}$ is selected from a $C_1$-$C_6$ alkylene group with an alkenyl group or an alkynyl group in its branched chain, and a substituted or unsubstituted $C_2$-$C_6$ linear alkenylene group, wherein the substituent is selected from one or more of a halogen atom, a $C_1$-$C_6$ alkyl group and a $C_2$-$C_6$ alkenyl group.

Formula II-0

Preferably, the cyclic carbonate compound containing a carbon-carbon unsaturated bond may be specifically selected from one or more of the following compounds, but not limited thereto:

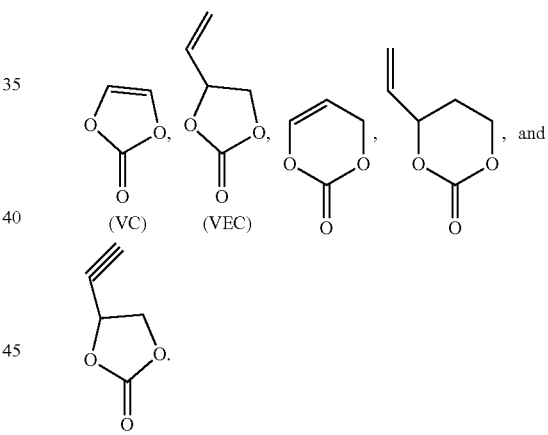

(VC)  (VEC)

(b) Halogen-Substituted Cyclic Carbonate Compound

The halogen-substituted cyclic carbonate compound may be selected from one or more of the compounds represented by Formula II-1. In Formula II-1, $R_{21}$ is selected from one or more of a halogen-substituted $C_1$-$C_6$ alkylene group, and a halogen-substituted $C_2$-$C_6$ alkenylene group.

Formula II-1

Specifically, the halogen-substituted cyclic carbonate compound may be selected from one or more of fluoroethylene carbonate (abbreviated as FEC), fluoropropylene carbonate (abbreviated as FPC), trifluoropropylene carbonate (abbreviated as TFPC), and trans- or cis-4,5-difluoro-1,3-dioxolan-2-one (hereinafter collectively referred to as "DFEC").

(c) Sulfate Compound

The sulfate compound is preferably a cyclic sulfate compound, and the cyclic sulfate compound may be selected from one or more of the compounds represented by Formula II-2. In Formula II-2, $R_{22}$ is selected from one or more of a substituted or unsubstituted $C_1$-$C_6$ alkylene group, or a substituted or unsubstituted $C_2$-$C_6$ alkenylene group, wherein the substituent is selected from one or more of a halogen atom, a $C_1$-$C_3$ alkyl group, or a $C_2$-$C_4$ alkenyl group.

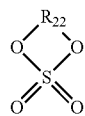

Formula II-2

Preferably, $R_{22}$ is selected from one or more of a substituted or unsubstituted $C_1$-$C_4$ alkylene group, and a substituted or unsubstituted $C_2$-$C_4$ alkenylene group, wherein the substituent is selected from one or more of a halogen atom, a $C_1$-$C_3$ alkyl group, and a $C_2$-$C_4$ alkenyl group.

Further preferably, the sulfate compound may be specifically selected from one or more of the following compounds, but not limited thereto:

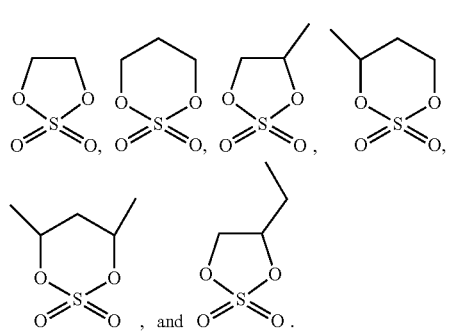

Still more preferably, the sulfate compound is selected from one or more of ethylene sulfate (i.e. 1,3,2-dioxathiolane 2,2-dioxide, abbreviated as DTD), trimethylene sulfite (abbreviated as TMS), and propylene sulfate (abbreviated as PLS), specifically the structures thereof are as follows:

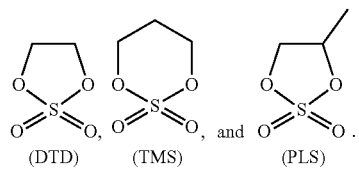

(DTD)  (TMS)  (PLS)

(d) Sultone Compound

The sultone compound is selected from one or more of the compounds represented by Formula II-3, and in Formula II-3, $R_{23}$ is selected from one or more of a substituted or unsubstituted $C_1$-$C_6$ alkylene group, and a substituted or unsubstituted $C_2$-$C_6$ alkenylene group, wherein the substituent is selected from one or more of a halogen atom, a $C_1$-$C_3$ alkyl group, and a $C_2$-$C_4$ alkenyl group.

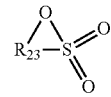

Formula II-3

Preferably, $R_{23}$ is selected from one or more of a substituted or unsubstituted $C_1$-$C_4$ alkylene group, and a substituted or unsubstituted $C_2$-$C_4$ alkenylene group, wherein the substituent is selected from one or more of a halogen atom, a $C_1$-$C_3$ alkyl group, and a $C_2$-$C_4$ alkenyl group.

Further preferably, the sultone compound may be specifically selected from one or more of the following compounds, but not limited thereto:

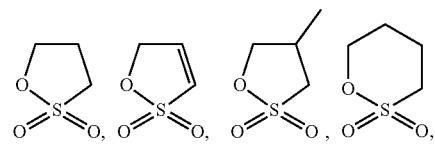

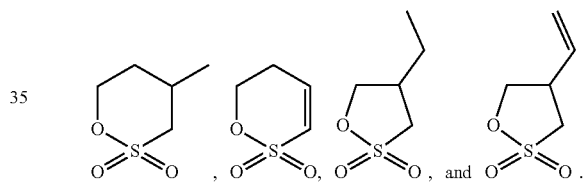

Still more preferably, the sultone compound may be selected from one or more of 1,3-propane sultone (abbreviated as PS) and 1,3-propene sultone (abbreviated as PES). The specific structures thereof are as follows:

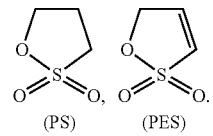

(PS)  (PES)

(e) Disulfonate Compound

The disulfonate compound is a compound containing two sulfonic acid groups (—S(=O)$_2$O—), preferably selected from a methylene disulfonate compound, and the methylene disulfonate compound may be selected from one or more of the compounds represented by Formula II-4. In Formula II-4, $R_{24}$, $R_{25}$, $R_{26}$ and $R_{27}$ are each independently selected from one or more of a hydrogen atom, a halogen atom, a substituted or unsubstituted $C_1$-$C_{10}$ alkyl group, and a substituted or unsubstituted $C_2$-$C_{10}$ alkenyl group, wherein the substituent is selected from one or more of a halogen atom, a $C_1$-$C_3$ alkyl group, and a $C_2$-$C_4$ alkenyl group.

Formula II-4

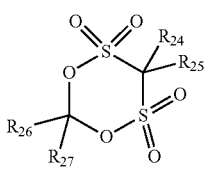

Preferably, $R_{24}$, $R_{25}$, $R_{26}$ and $R_{27}$ are each independently selected from one or more of a hydrogen atom, a halogen atom, a substituted or unsubstituted $C_1$-$C_4$ alkyl group, and a substituted or unsubstituted $C_2$-$C_6$ alkenyl group, wherein the substituent is selected from a one or more of a halogen atom, a $C_1$-$C_3$ alkyl group, and a $C_2$-$C_4$ alkenyl group.

Further preferably, the disulfonate compound may be specifically selected from one or more of the following compounds, but not limited thereto:

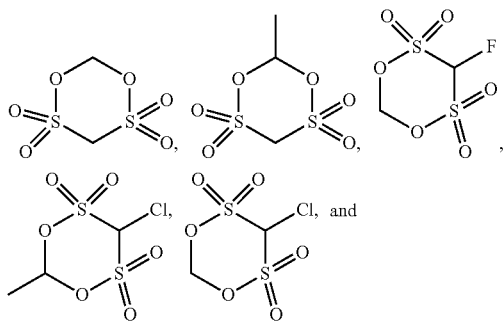

Still more preferably, the disulfonate compound may be selected from methanedisulfonate (abbreviated as MMDS), and the specific structure is as follows:

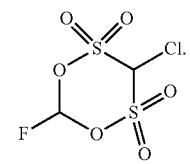

(f) Sulfite Compound

The sulfite compound is preferably a cyclic sulfite compound, and specifically may be selected from one or more of the compounds represented by Formula II-5. In Formula II-5, $R_{28}$ is selected from one or more of a substituted or unsubstituted $C_1$-$C_6$ alkylene group, and a substituted or unsubstituted $C_2$-$C_6$ alkenylene group, wherein the substituent is selected from one or more of a halogen atom, a $C_1$-$C_3$ alkyl group, and a $C_2$-$C_4$ alkenyl group.

Formula II-5

Preferably, $R_{28}$ is selected from one or more of a substituted or unsubstituted $C_1$-$C_4$ alkylene group, and a substituted or unsubstituted $C_2$-$C_4$ alkenylene group, wherein the substituent is selected from one or more of a halogen atom, a $C_1$-$C_3$ alkyl group, and a $C_2$-$C_4$ alkenyl group.

Further preferably, the sulfite compound may be selected from one or more of ethylene sulfite (abbreviated as ES), propylene sulfite (abbreviated as PS), and butylene sulfite (abbreviated as BS).

(g) Nitrile Compound

The nitrile compound may be selected from one or more of acetonitrile, propionitrile, succinonitrile, glutaronitrile, adiponitrile, pimelicnitrile, suberonitrile, and sebaconitrile.

Preferably, the nitrile compound is selected from one or more of succinonitrile, glutaronitrile, adiponitrile, and pimelicnitrile.

(h) Aromatic Compounds

The aromatic compound may be selected from one or more of cyclohexylbenzene, fluorocyclohexylbenzene compounds (1-fluoro-2-cyclohexylbenzene, 1-fluoro-3-cyclohexylbenzene, 1-fluoro-4-cyclohexylbenzene), tert-butylbenzene, tert-amylbenzene, 1-fluoro-4-tert-butylbenzene, biphenyl, terphenyl (ortho, meta, para), diphenyl ether, fluorobenzene, difluorobenzene (ortho, meta, para), anisole, 2,4-difluoroanisole, partially hydrogenated product of terphenyl (1,2-dicyclohexylbenzene, 2-phenylbicyclohexyl, 1,2-diphenylcyclohexane and o-cyclohexylbiphenyl).

Preferably, the aromatic compound may be selected from one or more of biphenyl, terphenyl (ortho, meta, para), fluorobenzene, cyclohexylbenzene, tert-butylbenzene, tert-amylbenzene. Further preferably, the aromatic compound may be selected from one or more of biphenyl, ortho-terphenyl, fluorobenzene, cyclohexylbenzene, and tert-amylbenzene.

(i) Isocyanate Compound

The isocyanate compound may be selected from one or more of methyl isocyanate, ethyl isocyanate, butyl isocyanate, phenyl isocyanate, tetramethylene diisocyanate, hexamethylene diisocyanate, octamethylene diisocyanate, 1,4-phenylene diisocyanate, 2-isocyanatoethyl acrylate, and 2-isocyanatoethyl methacrylate.

Preferably, the isocyanate compound may be selected from one or more of hexamethylene diisocyanate, octamethylene diisocyanate, 2-isocyanatoethyl acrylate, and 2-isocyanatoethyl methacrylate.

(j) Phosphazene Compound

The phosphazene compound is preferably a cyclic phosphazene compound. The cyclic phosphazene compound may be selected from one or more of methoxy pentafluorocyclotriphosphazene, ethoxy pentafluorocyclotriphosphazene, phenoxy pentafluorocyclotriphosphazene, and ethoxy heptafluorocyclotetraphosphazene.

Preferably, the cyclic phosphazene compound may be selected from one or more of methoxy pentafluorocyclotriphosphazene, ethoxy pentafluorocyclotriphosphazene, and phenoxy pentafluorocyclotriphosphazene.

Further preferably, the cyclic phosphazene compound may be selected from methoxy pentafluorocyclotriphosphazene or ethoxy pentafluorocyclotriphosphazene.

(k) Acid Anhydride Compound

The acid anhydride compound may be a chain acid anhydride or a cyclic acid anhydride. Specifically, the acid anhydride compound may be selected from one or more of acetic anhydride, propionic anhydride, succinic anhydride, maleic anhydride, 2-allyl succinic anhydride, glutaric anhydride, itaconic anhydride, and 3-sulfo-propionic anhydride.

Preferably, the acid anhydride compound may be selected from one or more of succinic anhydride, maleic anhydride, and 2-allyl succinic anhydride. Further preferably, the acid anhydride compound may be selected from one or both of succinic anhydride and 2-allyl succinic anhydride.

(l) Phosphite Compound

The phosphite compound may be selected from a silane phosphite compound, and specifically may be selected from one or more of the compounds represented by Formula II-6. In Formula II-6, $R_{31}$, $R_{32}$, $R_{33}$, $R_{34}$, $R_{35}$, $R_{36}$, $R_{37}$, $R_{38}$, and $R_{39}$ are each independently selected from a halogen-substituted or unsubstituted $C_1$-$C_6$ alkyl group.

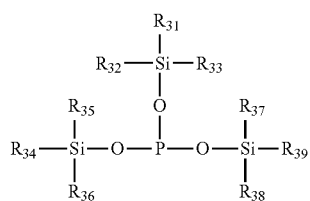

Formula II-6

Preferably, the silane phosphite compound may be specifically selected from one or more of the following compounds:

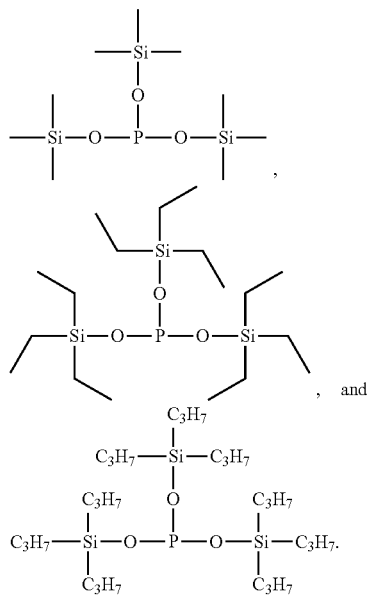

, and (m) Phosphate Compound

The phosphate compound may be selected from a silane phosphate compound, and specifically may be selected from one or more of the compounds represented by Formula II-7. In Formula II-7, $R_{41}$, $R_{42}$, $R_{43}$, $R_{44}$, $R_{45}$, $R_{46}$, $R_{47}$, $R_{48}$, and $R_{49}$ are each independently selected from a halogen-substituted or unsubstituted $C_1$-$C_6$ alkyl group.

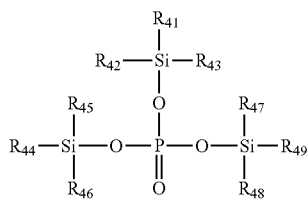

Formula II-7

Preferably, the silane phosphate compound may be specifically selected from one or more of the following compounds:

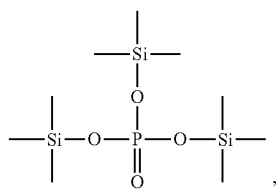

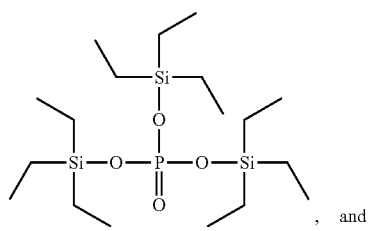

, and

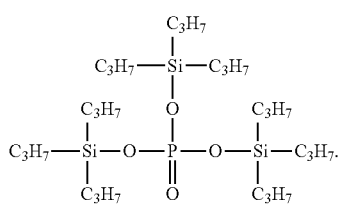

(n) Borate Compound

The borate compound may be selected from a silane borate compound, and specifically may be selected from one or more of the compounds represented by formula II-8. In Formula II-8, $R_{51}$, $R_{52}$, $R_{53}$, $R_{54}$, $R_{55}$, $R_{56}$, $R_{57}$, $R_{58}$, and $R_{59}$ are each independently selected from a halogen-substituted or unsubstituted $C_1$-$C_6$ alkyl group.

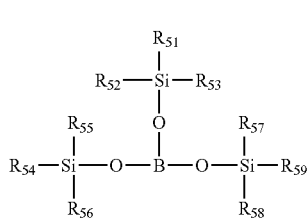

Formula II-8

Preferably, the silane boronate compound may be specifically selected from one or more of the following compounds:

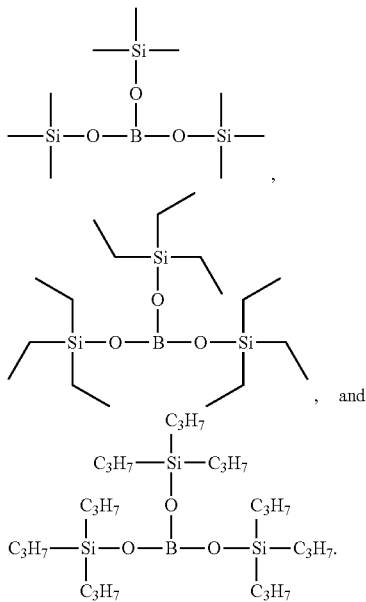

Preferably, the additive B comprises both a cyclic carbonate compound containing a carbon-carbon unsaturated bond and a halogen-substituted cyclic carbonate compound, which can be combined with each other to form an excellent SEI film on the surface of the negative electrode, thereby effectively preventing the other component in the electrolyte from contacting the negative electrons, suppressing the occurrence of the side reaction, and significantly improving the normal-temperature and high-temperature cycle performance of the battery.

[Organic Solvents]

The organic solvent used in the electrolyte of the embodiment of the present application comprises a cyclic carbonate and a chain carbonate, which may further improve the cycle performance and storage performance under high temperature and high voltage conditions, and which will adjust conductivity of the electrolyte to an appropriate range (i.e. conductivity of 6 mS/cm to 10 mS/cm at 25° C.). Thus it is more favorable for the additive film A and the additive B to achieve a better film forming effect.

Specifically, the cyclic carbonate may be selected from one or more of ethylene carbonate (abbreviated as EC), propylene carbonate (abbreviated as PC), 1,2-butylene carbonate, and 2,3-butylene glycol carbonate. More preferably, the cyclic carbonate may be selected from one or more of ethylene carbonate and propylene carbonate.

Specifically, the chain carbonate may be an asymmetric chain carbonate, preferably selected from one or more of ethyl methyl carbonate (referred to as MEC), methyl propyl carbonate (abbreviated as MPC), methyl isopropyl carbonate (referred to as MIPC), methyl butyl carbonate, and ethyl propyl carbonate; or a symmetric chain carbonate, preferably selected from one or more of dimethyl carbonate (abbreviated as DMC), diethyl carbonate (abbreviated as DEC), dipropyl carbonate and dibutyl carbonate; and may also be a mixture of an asymmetric chain carbonate with a symmetric chain carbonate.

The organic solvent may further comprise a carboxylic acid ester. That is to say, the organic solvent according to the present application may comprise a mixture of a cyclic carbonate, a chain carbonate, and a carboxylic acid ester.

Specifically, the carboxylic acid ester may be selected from one or more of methyl pivalate, ethyl pivalate, propyl pivalate, butyl pivalate, methyl butyrate, ethyl butyrate, propyl butyrate, butyl butyrate, methyl propionate, ethyl propionate, propyl propionate, butyl propionate, methyl acetate, ethyl acetate, propyl acetate and butyl acetate.

Carboxylic acid esters have the characteristics of large dielectric constant and low viscosity, which can effectively prevent the association of lithium ions with anions in the electrolyte, and are more advantageous to cyclic carbonates and chain carbonates in terms of ion conduction, especially at low temperature, thus the electrolyte can be guaranteed to have good ion conductivity.

Based on the total mass of the organic solvent, the mass percentage of the cyclic carbonate is 15% to 55%, preferably 25% to 50%; and the mass percentage of the chain carbonate is 15% to 74%, preferably 25% to 70%; the mass percentage of the carboxylic acid ester is 0.1% to 70%, preferably 5% to 50%.

[Electrolytic Salt]

As the electrolytic salt used in the present application, the following lithium salt can be suitably exemplified.

[Li salt-Type I]: It may be "a complex salts of Lewis acid with LiF" suitably selected from one or more of $LiPF_6$, $LiBF_4$, $LiAsF_6$, $LiSbF_6$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C3F7)$, preferably from $LiPF_6$, $LiBF_4$, $LiAsF_6$, and more preferably from $LiPF_6$ and $LiBF_4$.

[Li salt-Type II]: It may be "imine or methylated lithium salt" suitably selected from one or more of $LiN(SO_2F)_2$, $LiN(SO_2CF_3)_2$, $LiN(SO_2C_2F_5)_2$, $(CF_2)_2(SO_2)_2NLi$ (cyclic), $(CF_2)_3(SO_2)_2NLi$ (cyclic), and $LiC(SO_2CF_3)_3$, preferably from $LiN(SO_2F)_2$, $LiN(SO_2CF_3)_2$ or $LiN(SO_2C_2F_5)_2$, more preferably from $LiN(SO_2F)_2$ or $LiN(SO_2CF_3)_2$.

[Li salt-Type III]: It may be "a lithium salt containing a $S(=O)_2O$ structure" suitably selected from one or more of $LiSO_3F$, $LiCF_3SO_3$, $CH_3SO_4Li$, $C_2H_5SO_4Li$, $C_3H_7SO_4Li$, lithium trifluoro((methylsulfonyl)oxy)borate (LiTFMSB), lithium pentafluoro((methylsulfonyl)oxy)phosphate (LiPFMSP), more preferably from $LiSO_3F$, $CH_3SO_4Li$, $C_2H_5SO_4Li$ or LiTFMSB.

[Li salt-Type IV]: It may be "a lithium salt containing a P=O or Cl=O structure" suitably selected from one or more of $LiPO_2F_2$, $Li_2PO_3F$ and $LiClO_4$, preferably from $LiPO_2F_2$, $Li_2PO_3F$.

[Li salt-Type V]: It may be "a lithium salt with an oxalate ligand as an anion" suitably selected from lithium bis [oxalate-O,O'] borate (LiBOB), lithium difluoro [oxalate-O,O'] borate, lithium difluorobis[oxalate-O,O'] phosphate (LiPFO) and lithium tetrafluoro [oxalate-O,O'] phosphate, more preferably selected from LiBOB and LiPFO.

The above lithium salts may be used alone or in combination. Preferably, the lithium salt is selected from one or more of $LiPF_6$, $LiPO_2F_2$, $Li_2PO_3F$, $LiBF_4$, $LiSO_3F$, lithium trifluoro((methylsulfonyl)oxy)borate (LiTFMSB), $LiN(SO_2F)_2$, $LiN(SO_2CF_3)_2$, $LiN(SO_2C_2F_5)_2$, lithium bis[oxalate-O,O'] borate (LiBOB), lithium difluorobis[oxalate-O,O'] phosphate (LiPFO) and lithium tetrafluoro [oxalate-O,O'] phosphate. More preferably, the lithium salt is selected from one or more of $LiPF_6$, $LiBF_4$, $LiSO_3F$, lithium trifluoro ((methylsulfonyl)oxy)borate (LiTFMSB), $LiPO_2F_2$, $LiN(SO_2CF_3)_2$, $LiN(SO_2F)_2$, lithium bis[oxalate-O,O'] borate (LiBOB) and lithium difluorobis[oxalate-O,O'] phosphate (LiPFO). Further preferably, the lithium salt is $LiPF_6$.

In the electrolyte of the first aspect of the present application, the preparation method of the electrolyte is not limited, and it can be prepared according to the conventional method for preparing an electrolyte. For example, it can be obtained by mixing the above organic solvents, adding an electrolyte salt thereto, and adding the additive A and the additive B thereto.

In the electrolyte of the first aspect of the present application, the additive A can be synthesized by the following method.

Synthesis of the compound of Formula I-1:

The reaction equation is:

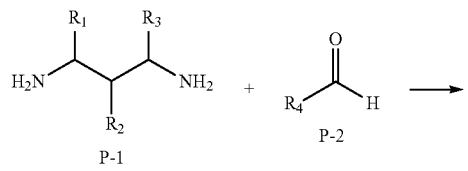

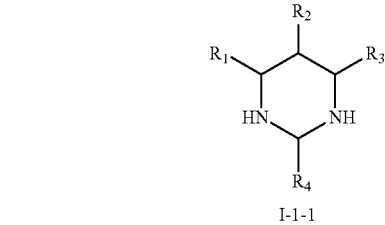

The specific preparation process is:

P-2 aqueous solution with a concentration of 30%~40% was added dropwise to the raw material P-1 in 20 min to 60 min and stirred rapidly. After the completion of the dropwise addition, the mixture was rapidly stirred for 15 h to 30 h, and stirred at 70° C. to 90° C. for 3-5 h in an oil bath, to obtain colorless fuming viscous liquid intermediate I-1-1; then $K_2CO_3$, KI and anhydrous acetonitrile were added, and the mixture was rapidly stirred into a solid-liquid mixed phase, and raw material P-3 was quickly added at 40° C.~60° C. After stirring for 10 h to 20 h, the resulting mixture was cooled to room temperature, and purified by isolation to obtain a compound of Formula I-1.

(2) Preparation of a Compound Represented by Formula I-2:

The reaction equation is:

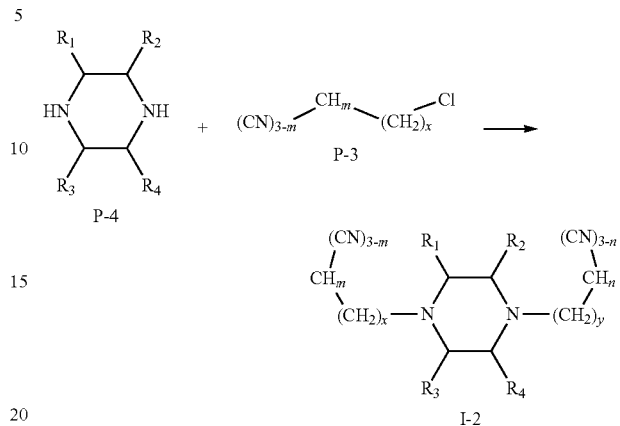

The specific preparation process is:

The anhydrous sodium carbonate, the raw material P-4 and the raw material P-3 were mixed in absolute ethanol, and the mixture was stirred for 2-5 h, then washed with hot ethanol for several times to obtain a crude product, which was then recrystallized to obtain a compound represented by Formula I-2.

(3) Preparation of a Compound Represented by Formula I-3:

The reaction equation is:

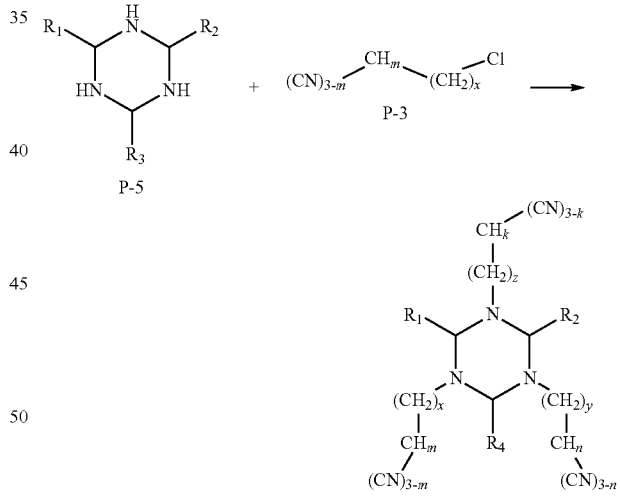

The specific preparation process is:

The anhydrous sodium carbonate, the raw material P-5 and the raw material P-3 were mixed in absolute ethanol, and the mixture was stirred for 2-5 h, then washed with hot ethanol for several times to obtain a crude product, which was then recrystallized to obtain a compound represented by Formula I-3.

A battery according to the second aspect of the present application is explained below.

The battery according to the second aspect of the present application comprises a positive electrode plate, a negative electrode plate, a separator disposed between the positive electrode plate and the negative electrode plate, and an electrolyte according to the first aspect of the present application. It should be noted that the battery according to the second aspect of the present application may be a lithium-ion battery, a sodium-ion battery or a magnesium-ion battery.

When the battery is a lithium-ion battery, the positive electrode comprises a positive active material capable of deintercalating and intercalating lithium ions, and the negative electrode comprises a negative active material capable of intercalating and deintercalating lithium ions.

Specifically, when the battery is a lithium-ion battery, the positive active material may be selected from one or more of lithium cobalt oxide, lithium nickel oxide, lithium manganese oxide, lithium nickel manganese oxide, lithium nickel cobalt manganese oxide, lithium nickel cobalt aluminum oxide, and a compound obtained by adding other transition metal or non-transition metal to the above oxides. Specifically, a layered lithium-containing oxide, a spinel-type lithium-containing oxide, an olivine-type lithium-containing phosphate compound, or the like can be used. However, the present application is not limited to these materials, and other conventionally known materials which can be used as a positive active material for a lithium-ion battery can also be used. These positive active materials may be used alone or in combination of two or more. Preferably, the positive active material contains Co element. Further preferably, the positive active material is lithium cobaltate.

Specifically, when the battery is a lithium-ion battery, the negative active material may be selected from soft carbon, hard carbon, artificial graphite, natural graphite, silicon, silicon oxide, silicon carbon composite, lithium titanium oxide, and the metal which can form an alloy with lithium, etc. Specifically, a carbon-based material, a silicon-based material, a tin-based material, or the like can be used. However, the present application is not limited to these materials, and other conventionally known materials which can be used as a negative active material for a lithium-ion battery can also be used. These negative e active materials may be used alone or in combination of two or more.

When the battery is a sodium-ion battery, the positive electrode comprises a positive active material capable of deintercalating and intercalating sodium ions, and the negative electrode comprises a negative active material capable of intercalating and deintercalating sodium ions.

Specifically, the positive active material may be selected from sodium iron composite oxide ($NaFeO_2$), sodium cobalt composite oxide ($NaCoO_2$), sodium chromium composite oxide ($NaCrO_2$), sodium manganese composite oxide ($NaMnO_2$), sodium nickel composite oxide ($NaNiO_2$), sodium nickel titanium composite oxide ($NaNi_{1/2}Ti_{1/2}O_2$), sodium nickel manganese composite oxide ($NaNi_{1/2}Mn_{1/2}O_2$), sodium iron manganese composite oxide ($Na_{2/3}Fe_{1/3}Mn_{2/3}O_2$), sodium nickel cobalt manganese composite oxide ($NaNi_{1/3}Co_{1/3}Mn_{1/3}O_2$), sodium iron phosphate compound ($NaFePO_4$), sodium manganese phosphate compound ($NaMnPO_4$), sodium cobalt phosphate compound ($NaCoPO_4$), and the like. However, the present application is not limited to these materials, and other conventionally known materials which can be used as a positive active material for a sodium-ion battery can be used in the present application. These positive active materials may be used alone or in combination of two or more.

Specifically, the negative active material may be selected from carbon materials such as hard carbon, natural graphite, artificial graphite, soft carbon, carbon black, acetylene black, carbon nanotubes, graphene, carbon nanofibers, and the like. Further, examples of the other negative active material include a simple substance of an element which can be alloyed with sodium such as Si, Ge, Pb, In, Zn, H, Ca, Sr, Ba, Ru, and Rh, and oxides and carbides containing these elements. However, it is not limited to these materials, and other conventionally known materials which can be used as a negative active material for a sodium-ion battery can be used in the present application. These negative active materials may be used alone or in combination of two or more.

When the battery is a magnesium-ion battery, the positive electrode comprises a positive active material capable of deintercalating and intercalating magnesium ions, and the negative electrode comprises a negative active material capable of intercalating and deintercalating magnesium ions. For example, the positive active material may be selected from $V_2O_5$, $MoO_3$, $MnO_2$, $TiS_2$, $MoS_2$, etc., and the negative active material may be selected from magnesium metal, magnesium alloy, graphite, and the like. However, it is not limited to these materials, and other conventionally known materials which can be used as active materials for positive and negative electrodes of a magnesium-ion battery can be used in the present application. These positive and negative active materials may be used alone or in combination of two or more.

In the battery of the second aspect of the present application, the specific type of the separator is not particularly limited, and may be any separator material used in the existing battery, such as polyethylene, polypropylene, polyvinylidene fluoride, and multilayer composite film thereof, but not limited to these.

In the battery of the second aspect of the present application, the positive electrode plate further comprises a binder and a conductive agent. A positive electrode slurry containing a positive active material, a binder, and a conductive agent is coated on the positive electrode current collector, and a positive electrode plate is obtained after the positive electrode slurry is dried. Similarly, the negative electrode plate further comprises a binder and a conductive agent. A negative electrode slurry containing a negative active material, a binder, and a conductive agent is coated on the negative electrode current collector, and a negative electrode plate is obtained after the negative electrode slurry is dried.

In the battery of the second aspect of the present application, the charge cutoff voltage of the battery may be not less than 4.2 V, that is, the battery may be used in a high voltage state of not less than 4.2 V. In the high voltage state, the higher the valence state of the transition metal on the surface of the positive active material is, the stronger the Coulomb interaction with the cyano group in the additive A is. That is to say, the additive A can exert a corresponding protective effect to a greater extent. Preferably, the battery can word in the range of 4.2V to 4.9V, and further preferably, the battery can work in the range of 4.3V to 4.8V.

In order to make the objects, technical solutions and beneficial technical effects of the present application more clear, the present application will be further described in detail below with reference to the embodiments. It is to be understood that the embodiments described in the specification are merely illustrative of the application, and are not intended to limit the scope of the application.

In the following specific embodiments of the present application, only the embodiment in which the battery is a lithium-ion battery is shown, but the application is not limited thereto. In the examples and comparative examples, the reagents, materials, and instruments used are commercially available unless otherwise specified. The specific synthesis process of the additives A1, A2, and A3 is as follows, and other kinds of additives A can be synthesized according to a similar process.

Synthesis of Additive A1:

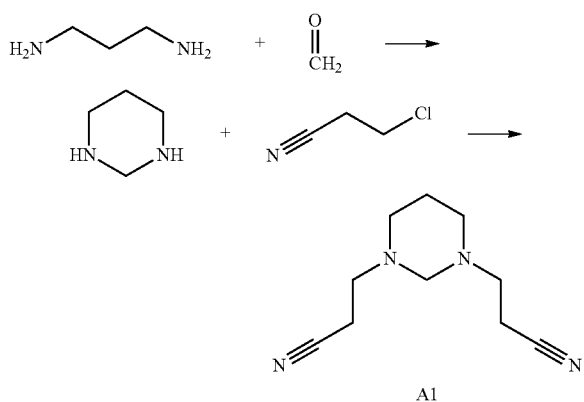

37% formaldehyde aqueous solution is added dropwise to 1,3-propanediamine in 0.5 h and stirred rapidly. After the completion of the dropwise addition, rapid stirring is continued for 20 h, followed by refluxing in an oil bath at 80° C. for 4 h to obtain a colorless fuming viscous liquid, i.e. the intermediate product hexahydropyrimidine; continue to add $K_2CO_3$, KI, anhydrous acetonitrile, quickly stir into a solid-liquid mixed phase, then add β-chloropropionitrile in 0.5 h at 60° C., continue stirring for 17 h, then cool to room temperature. After separation and purification, A1 is obtained. The nuclear magnetic resonance spectrum is shown in FIG. 1.

Synthesis of Additive A2:

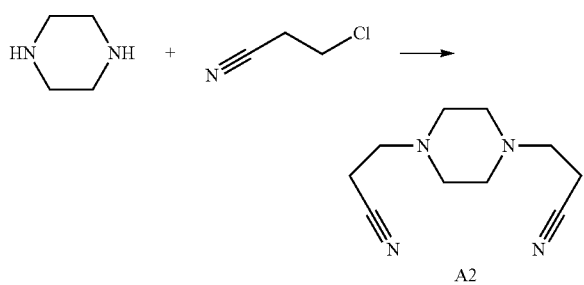

Anhydrous sodium carbonate, piperazine and β-chloropropionitrile are mixed in absolute ethanol, and the reaction was stirred for 4 hours; the resulting mixture is washed with hot ethanol for several times to obtain a crude product, which is recrystallized to obtain A2. The nuclear magnetic resonance spectrum is shown in FIG. 2.

Synthesis of Additive A3:

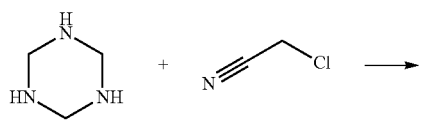

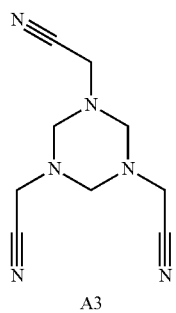

Anhydrous sodium carbonate, 1,3,5-triazine and chloroacetonitrile are mixed in absolute ethanol, and the reaction was stirred for 4 hours; the resulting mixture is washed with hot ethanol for several times to obtain a crude product, which is recrystallized to obtain A3. The nuclear magnetic resonance spectrum is shown in FIG. 3.

In the examples and comparative examples, lithium-ion batteries were prepared in the following manner.

(1) Preparation of electrolyte: The mixture of at least one of propylene carbonate (abbreviated as PC) and ethylene carbonate (abbreviated as EC), at least one of ethyl methyl carbonate (abbreviated as EMC) and diethyl carbonate (abbreviated as DEC), and at least one of methyl propionate, ethyl propionate, methyl acetate, and ethyl acetate was used as an organic solvent, and the mixing ratio thereof was adjusted to achieve a desired electrolyte viscosity and conductivity. The lithium salt was $LiPF_6$, and the total content of $LiPF_6$ was 12.5% based on the total mass of the electrolyte. Each additive was added in accordance with the electrolyte composition as shown in Table 1, wherein the content of each additive component was based on the total mass of the electrolyte.

(2) Preparation of positive electrode plate: The positive active material $LiCoO_2$, the binder PVDF, the conductive agent acetylene black were mixed at a mass ratio of 98:1:1, then the N-methylpyrrolidone was added, and stirred under a vacuum stirrer until stable and uniform. The positive electrode slurry was obtained; then the positive electrode slurry was uniformly coated on the aluminum foil; the aluminum foil was air-dried at room temperature, and transferred to a blast oven to dry at 120° C. for 1 hour, and then subjected to cold pressing and slitting to obtain a positive electrode plate.

(3) Preparation of negative electrode plate: The negative active material graphite, the conductive agent acetylene black, the thickener carboxymethyl cellulose sodium solution, and the binder styrene-butadiene rubber emulsion are mixed at a mass ratio of 97:1:1:1, then deionized water was added, and stirred under a vacuum stirrer until stable and uniform. The negative electrode slurry was obtained; then the negative electrode slurry was uniformly coated on the copper foil; the copper foil was air-dried at room temperature, and transferred to a blast oven to dry at 120° C. for 1 hour, and then subjected to cold pressing and slitting to obtain a negative electrode plate.

(4) Preparation of lithium-ion battery: The positive electrode plate, the negative electrode plate and the PP/PE/PP separator were wound to obtain a battery core, and after the battery core was placed in the package, the electrolyte was injected, and then the sealing was sequentially performed. A lithium-ion battery was obtained by processes such as standing, hot-cold pressing, chemical formation, exhausting, and capacity test.

TABLE 1

Electrolyte parameters of Examples 1-16 and Comparative Examples 1-6

| | Conductivity mS/cm | Additive A Type | Content | Additive B Type | Content | Type | Content |
|---|---|---|---|---|---|---|---|
| Example 1 | 6 | A1 | 2% | PS | 0.1% | / | / |
| Example 2 | 8 | A1 | 2% | DTD | 0.5% | / | / |
| Example 3 | 10 | A1 | 2% | FEC | 2% | / | / |
| Example 4 | 8 | A1 | 0.1% | VC | 2% | / | / |
| Example 5 | 8 | A1 | 0.5% | VC | 2% | / | / |
| Example 6 | 8 | A1 | 1% | VC | 2% | / | / |
| Example 7 | 8 | A1 | 1.5% | VC | 2% | / | / |
| Example 8 | 8 | A1 | 2% | VC | 2% | / | / |
| Example 9 | 8 | A1 | 3% | VC | 2% | / | / |
| Example 10 | 8 | A1 | 2% | VC | 5% | / | / |
| Example 11 | 8 | A1 | 2% | VC | 8% | / | / |
| Example 12 | 8 | A1 | 2% | VC | 10% | / | / |
| Example 13 | 8 | A2 | 2% | VC | 2% | / | / |
| Example 14 | 8 | A3 | 2% | VC | 2% | / | / |
| Example 15 | 8 | A1 | 2% | VC | 2% | FEC | 0.5% |
| Example 16 | 8 | A1 | 2% | VC | 2% | FEC | 2% |
| Comparative Example 1 | 4 | A1 | 2% | VC | 2% | / | / |
| Comparative Example 2 | 12 | A1 | 2% | VC | 2% | / | / |
| Comparative Example 3 | 8 | / | / | VC | 2% | / | / |
| Comparative Example 4 | 8 | A1 | 2% | / | / | / | / |
| Comparative Example 5 | 8 | / | / | / | / | / | / |
| Comparative Example 6 | 8 | adiponitrile | 2% | / | / | / | / |

Note:
PS represents 1,3-propane sultone;
DTD represents ethylene sulfate;
FEC represents fluoroethylene carbonate; and
VC represents vinylene carbonate.

The test process of the lithium-ion battery is described below.

(1) Cyclic performance test of lithium-ion battery under normal temperature and high voltage conditions At 25° C., the lithium-ion battery was first charged with a constant current of 1 C to a voltage of 4.35 V, further charged with a constant voltage of 4.35 V until the current was 0.05 C, and then discharged with a constant current of 1 C to a voltage of 3.0 V. Charging/discharging cycle was done in such way. The discharge capacity at the first time was the discharge capacity of the first cycle. The lithium-ion battery was subjected to 200 cycles of charge/discharge test in accordance with the above method, and the discharge capacity at the $200^{th}$ cycle was detected.

Capacity retention ratio (%) of lithium-ion battery of the $200^{th}$ cycle=(discharge capacity of the $200^{th}$ cycle/discharge capacity of lithium-ion battery at the first cycle)×100%.

(2) Cycle performance test of lithium-ion battery under high temperature and high voltage conditions At 45° C., the lithium-ion battery was first charged with a constant current of 1 C to a voltage of 4.35 V, further charged with a constant voltage of 4.35 V until the current was 0.05 C, and then discharged with a constant current of 1 C to a voltage of 3.0 V. Charging/discharging cycle was done in such way. The discharge capacity at the first time was the discharge capacity of the first cycle. The lithium-ion battery was subjected to 200 cycles of charge/discharge test in accordance with the above method, and the discharge capacity at the $200^{th}$ cycle was detected.

Capacity retention ratio (%) of lithium-ion battery of the $200^{th}$ cycle=(discharge capacity of the $200^{th}$ cycle/discharge capacity of lithium-ion battery at the first cycle)×100%.

(3) Storage performance test of lithium-ion battery under high temperature conditions At 25° C., the lithium-ion battery was charged with a constant current of 0.5 C to a voltage of 4.35 V, and then charged with a constant voltage of 4.35 V until the current was 0.05 C. At this time, the thickness of the lithium-ion battery was tested and recorded as $h_0$; then the lithium-ion was placed in an incubator at 85° C., and stored for 24 hours. Then the battery was taken out and the thickness of the lithium-ion battery was measured and recorded as $h_1$.

The thickness expansion ratio (%) of the lithium-ion battery after storage at 85° C. for 24 hours=$[(h_1-h_0)/h_0]\times 100\%$.

(4) Low-Temperature Performance Test of Lithium-Ion Battery

Put the lithium-ion battery into the holding furnace, adjust the furnace temperature to 25° C., then charge the lithium-ion battery to a voltage of 4.35V with a constant current of 0.5 C, and then charge it to a current of 0.05 C with a constant voltage of 4.35V. During the above process the lithium-ion battery was fully charged. The fully charged lithium-ion battery was discharged with a constant current of 0.5 C to a voltage of 3.0 V. This process caused the lithium-ion battery to be fully discharged, and the discharge capacity during the full discharge was recorded as $C_0$.

After the temperature of the holding furnace was adjusted to −20° C., it was allowed to stand for 60 minutes. After the temperature in the furnace reached −20° C., the above full charge and full discharge processes were repeated, and the discharge capacity during the full discharge was recorded as $C_1$.

Capacity retention rate of lithium-ion battery at −20° C. (%)=(C1/C0)×100%.

TABLE 2

Test results of Examples 1-16 and Comparative Examples 1-6

| | 25° C./4.35 V/ Capacity retention ratio (%) after 200 cycles | 45° C./4.35 V/ Capacity retention ratio (%) after 200 cycles | 85° C. 24 h Thickness expansion ratio | −20° C. Capacity retention ratio |
|---|---|---|---|---|
| Example 1 | 88.16% | 86.83% | 30.90% | 53.01% |
| Example 2 | 89.20% | 87.40% | 31.29% | 55.93% |
| Example 3 | 90.15% | 87.75% | 32.73% | 58.75% |
| Example 4 | 87.62% | 84.96% | 33.62% | 52.51% |
| Example 5 | 87.93% | 85.16% | 33.15% | 52.93% |
| Example 6 | 88.13% | 85.31% | 32.31% | 53.06% |
| Example 7 | 88.59% | 86.10% | 31.51% | 52.88% |
| Example 8 | 89.37% | 87.65% | 30.66% | 54.59% |
| Example 9 | 88.29% | 85.34% | 29.98% | 52.87% |
| Example 10 | 88.35% | 85.94% | 30.07% | 54.08% |
| Example 11 | 88.31% | 85.88% | 31.22% | 53.38% |
| Example 12 | 87.01% | 84.32% | 32.87% | 52.10% |
| Example 13 | 89.09% | 87.04% | 30.08% | 54.27% |
| Example 14 | 89.39% | 87.14% | 29.67% | 54.31% |
| Example 15 | 89.53% | 87.74% | 30.48% | 54.47% |
| Example 16 | 89.69% | 86.38% | 29.68% | 54.43% |
| Comparative Example 1 | 87.11% | 86.98% | 31.29% | 50.31% |
| Comparative Example 2 | 86.31% | 85.99% | 32.03% | 52.32% |
| Comparative Example 3 | 85.69% | 85.03% | 32.59% | 51.92% |
| Comparative Example 4 | 87.37% | 86.92% | 30.04% | 53.05% |
| Comparative Example 5 | 84.86% | 82.41% | 35.87% | 50.06% |
| Comparative Example 6 | 86.04% | 85.72% | 31.05% | 52.43% |

From the comparison of Comparative Examples 4~6, it can be seen that the addition of a nitrogen-containing six-membered heterocyclic compound with more than one cyano group to the electrolyte of a lithium-ion battery can improve the high-voltage and high-temperature cycle performance of the lithium-ion battery to some extent, and improve the high-temperature storage performance of the lithium-ion battery, while at the same time is able to balance the low-temperature performance of the lithium-ion battery. The reason is that the nitrogen-containing six-membered heterocyclic compound with more than one cyano group has a plurality of cyano groups, and the lone pair electrons contained in the nitrogen atom of the cyano group can strongly complex with the 3d empty orbit of the transition metal on the surface of positive active materials, and effectively passivate the surface of positive active materials, reducing the surface activity of positive active materials while isolating the electrolyte from directly contacting with the surface of positive active materials to reduce the occurrence of side reactions, and the lithium ions consumed in the side reaction are correspondingly reduced, and the consumption rate of the reversible lithium ion is greatly slowed down. In turn, the cycle capacity retention ratio has increased significantly. In addition, in a lithium-ion battery, a part of the side reaction on the surface of positive active materials generates a gas, so that the lithium-ion battery expands in the thickness direction, thereby reducing the side reaction on the surface means that the gas generation amount is reduced, and the thickness expansion rate of the lithium-ion battery at a high temperature is significantly reduced. At the same time, the nitrogen-containing six-membered heterocyclic molecule with more than one cyano group can improve the conductivity of the electrolyte to some extent and improve the kinetic performance of the lithium-ion battery, so it also has a certain improvement effect on the low-temperature performance of the lithium-ion battery.

Compared with the linear adiponitrile used in Comparative Example 6, the distance between the cyano groups in the nitrogen-containing six-membered heterocyclic ring with more than one cyano group is closer to the distance between the transition metals on the surface of positive active materials, due to the adjustment of the nitrogen-containing six-membered heterocyclic structure. Thus, a larger amount of cyano groups can be used to enhance the passivation surface effect, so the surface coverage of positive active materials is much stronger than that of adiponitrile, and the improvement of cycle and storage performance is more prominent.

From the comparison of Examples 1-14 and Comparative Example 4, it can be seen that for an electrolyte containing 2% of nitrogen-containing six-membered heterocyclic compound with more than one cyano group, the addition of 0.1% to 10% of a film-forming additive for negative electrode such as PS, DTD, FEC or VC can significantly improve the cycle capacity retention ratio of the lithium-ion battery at normal temperature and at 45° C., and the storage performance at 85° C. and the low-temperature performance of the fully charged lithium-ion battery are not deteriorated. The reason is that the reduction potential of the negative electrode film-forming additive such as PS is higher than that of EC and PC. During the charging and discharging process of the lithium-ion battery, the reduction reaction will occur in the negative electrode before EC and PC, and when combined with the nitrogen-containing six-membered heterocyclic compound with more than one cyano group, it can form a uniform and dense SEI film on the surface of the negative electrode, effectively isolate the other components in the electrolyte from contacting the negative electrode electrons, and suppress the side reaction, thereby significantly improving the cycle performance of the lithium-ion battery at normal temperature and at 45° C. At the same time, since the effect of the nitrogen-containing six-membered heterocyclic compound with more than one cyano group on protecting the positive electrode from gas production still exists, the storage performance of the lithium-ion battery at 85° C. is not significantly deteriorated compared with the Comparative example 4. In addition, the addition of the negative electrode film-forming additive does not change the conductivity of the electrolyte, so the kinetic performance of the lithium-ion battery is not affected, and the low-temperature performance remains substantially unchanged. In combination with Comparative Example 3, it is found that the addition of 2% VC alone has a poor effect on the cycle capacity retention ratio at room temperature, on the cycle capacity retention ratio at 45° C., and on the capacity retention ratio at low temperature, and during the storage at 85° C. gas generation problem is serious.

It can be seen from Examples 15 to 16 that, after further adding FEC in the electrolyte containing the 2% nitrogen-containing six-membered heterocyclic compound with more than one cyano group and 2% of VC, the cycle capacity retention ratio of the lithium-ion battery at room temperature and at 45° C. is further improved, and the high-temperature storage performance and low-temperature performance remain basically unchanged. This is because when the electrolyte contains both a cyclic carbonate compound (VC) containing a carbon-carbon unsaturated bond and a halogen-substituted cyclic carbonate compound (FEC), the quality of the SEI film formed on the surface of the negative electrode is further improved, which will effectively isolate other components in the electrolyte from contacting the negative electrode electrons, inhibiting the side reaction, and more significantly improving the cycle performance of the lithium-ion battery at normal temperature and at 45° C. At the same time, since the effect of the nitrogen-containing six-membered heterocyclic compound with more than one cyano group on protecting the positive electrode from gas production and on stabilizing conductivity still exists, so the high-temperature storage performance and low-temperature performance of the lithium-ion battery remain unchanged.

It can be seen from Comparative Examples 1 to 2 that the conductivity of the electrolyte also affects the performance of the lithium-on battery. When the conductivity of the electrolyte is too small, the electrolyte kinetic performance is poor, and the low-temperature performance of the lithium-ion battery is poor; and when the conductivity is too small, the viscosity of the electrolyte is large, and the adsorption film formation effect of nitrogen-containing six-membered heterocyclic compound with more than one cyano group on the surface of the positive electrode is also affected. This also affects the film formation effect of the film forming additive such as VC on the SEI film formed on the surface of the negative electrode; when the conductivity of the electrolyte is too large, the thermal stability of the electrolyte is poor, and the high-temperature performance of the lithium-on battery is poor.

It will be apparent to those skilled in the art that the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

The invention claimed is:

1. An electrolyte comprising an electrolytic salt and an organic solvent, wherein the organic solvent comprises a cyclic carbonate and a chain carbonate, wherein
the electrolyte further comprises an additive A and an additive B, wherein the additive A is a positive electrode film-forming additive, the additive B is a negative electrode film-forming additive, the reduction potential of the additive B is higher than that of the cyclic carbonate, and the additive A is one or more selected from the group consisting of the compounds of Formula I-1, Formula I-2, and Formula I-3;

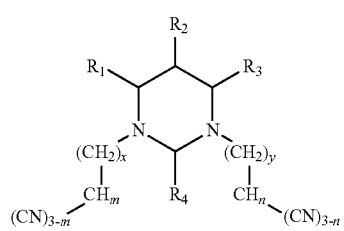

Formula I-1

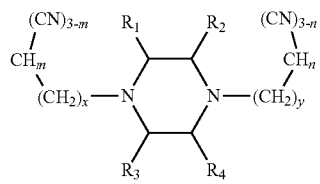

Formula I-2

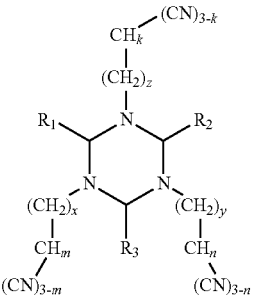

Formula I-3 in Formula I-1, Formula I-2, Formula I-3: $R_1$, $R_2$, $R_3$, $R_4$ are each independently selected from a hydrogen atom, a halogen atom, a substituted or unsubstituted $C_1$-$C_{12}$ alkyl group, a substituted or unsubstituted $C_1$-$C_{12}$ alkoxy group, a substituted or unsubstituted $C_1$-$C_{12}$ amino group, a substituted or unsubstituted $C_2$-$C_{12}$ alkenyl group, a substituted or unsubstituted $C_2$-$C_{12}$ alkynyl group, a substituted or unsubstituted $C_6$-$C_{26}$ aryl group, and a substituted or unsubstituted $C_2$-$C_{12}$ heterocyclic group, wherein the substituent is one or more selected from the group consisting of a halogen atom, a cyano group, a $C_1$-$C_6$ alkyl group, a $C_2$-$C_6$ alkenyl group, and a $C_1$-$C_6$ alkoxy group; wherein x, y, and z are each independently selected from an integer of 0 to 8; m, n, and k are each independently selected from an integer of 0 to 2;

wherein the additive B comprises a cyclic carbonate compound containing a carbon-carbon unsaturated bond and a halogen-substituted cyclic carbonate compound at the same time;

wherein the electrolyte has a conductivity of 6 mS/cm to 10 mS/cm at 25° C.;

wherein the additive A has a mass percentage of 0.1% to 3.5% based on the total mass of the electrolyte;

wherein the additive B has a mass percentage of 0.1% to 10% based on the total mass of the electrolyte.

2. The electrolyte according to claim 1, wherein the additive A is one or more selected from the group consisting of the following compounds:

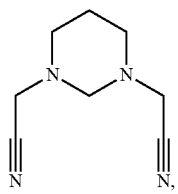

Formula I-1-1

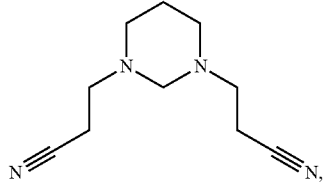

Formula I-1-2

-continued
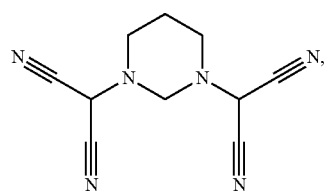
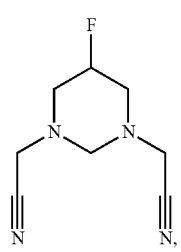
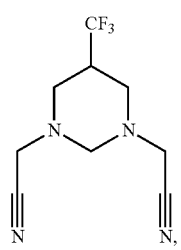
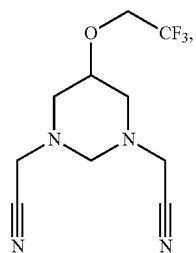
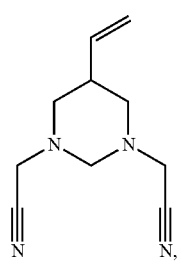
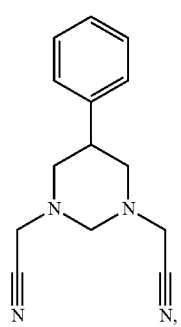
-continued
Formula I-1-3
Formula I-1-4
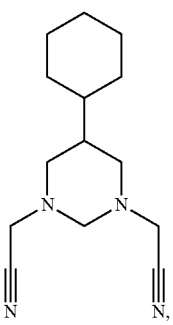
Formula I-1-5
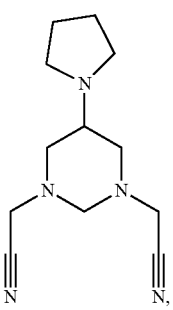
Formula I-1-6
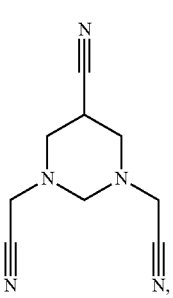
Formula I-1-7
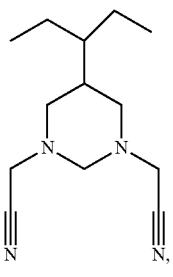
Formula I-1-8
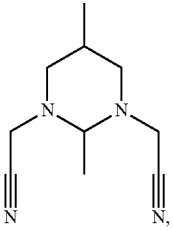
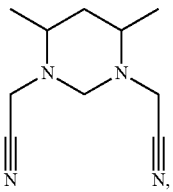
Formula I-1-9
Formula I-1-10
Formula I-1-11
Formula I-1-12
Formula I-1-13
Formula I-1-14

-continued
Formula I-2-1
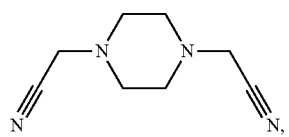
Formula I-2-2
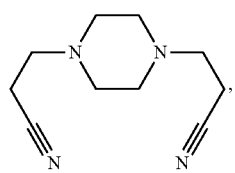
Formula I-2-3
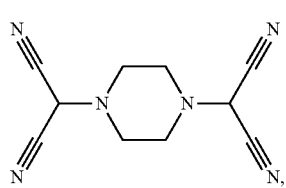
Formula I-2-4
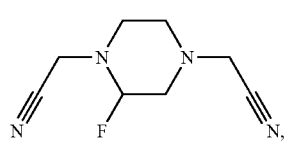
Formula I-2-5
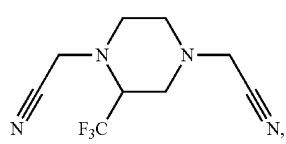
Formula I-2-6
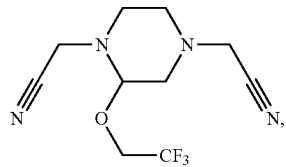
Formula I-2-7
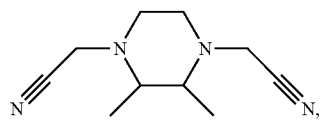
Formula I-2-8
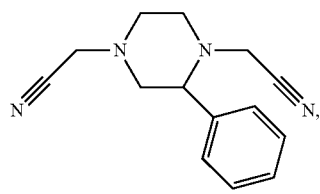
Formula I-2-9
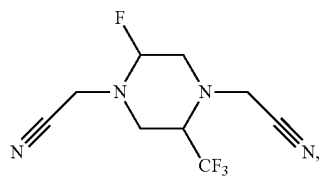
-continued
Formula I-3-1
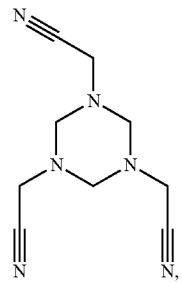
Formula I-3-2
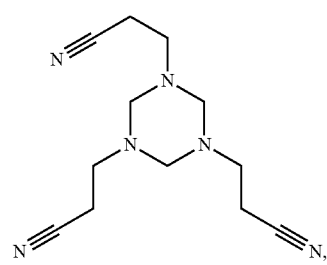
Formula I-3-3
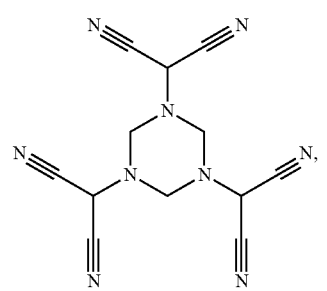
Formula I-3-4
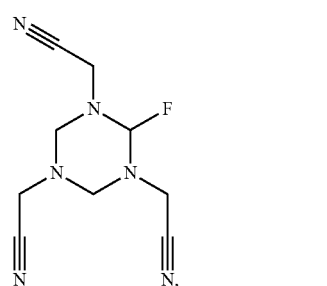
Formula I-3-5
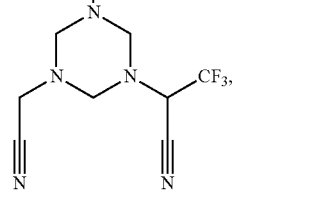

Formula I-3-6
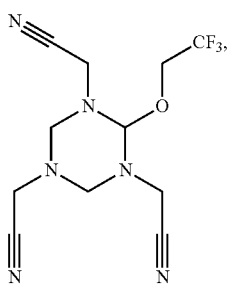

Formula I-3-7
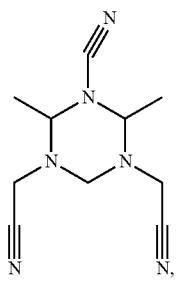

Formula I-3-8
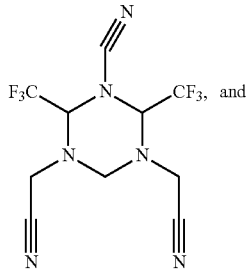

Formula I-3-9
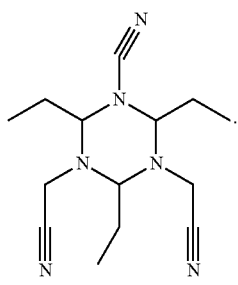

3. The electrolyte according to claim 1, wherein the organic solvent comprises the cyclic carbonate, the chain carbonate, and further comprises a carboxylic acid ester.

4. The electrolyte according to claim 3, wherein the cyclic carbonate is one or more selected from the group consisting of ethylene carbonate, propylene carbonate, butylene carbonate, 1,2-butylene carbonate, and 2,3-butylene glycol carbonate; and wherein the chain carbonate is one or more selected from the group consisting of ethyl methyl carbonate, methyl propyl carbonate, methyl isopropyl carbonate, methyl butyl carbonate, ethyl propyl carbonate, dimethyl carbonate, diethyl carbonate, dipropyl carbonate, and dibutyl carbonate; and wherein the carboxylic acid ester is one or more selected from the group consisting of methyl pivalate, ethyl pivalate, propyl pivalate, butyl pivalate, methyl butyrate, ethyl butyrate, propyl butyrate, butyl butyrate, methyl propionate, ethyl propionate, propyl propionate, butyl propionate, methyl acetate, ethyl acetate, propyl acetate and butyl acetate.

5. The electrolyte according to claim 3, wherein based on the total mass of the organic solvent, the cyclic carbonate has a mass percentage of 15% to 55%;

the chain carbonate has a mass percentage of 15% to 74%;

the carboxylic acid ester has a mass percentage of 0.1% to 70%.

6. The electrolyte according to claim 3, wherein based on the total mass of the organic solvent, the cyclic carbonate has a mass percentage of 25% to 50%.

7. The electrolyte according to claim 3, wherein based on the total mass of the organic solvent, the chain carbonate has a mass percentage of 25% to 70%.

8. The electrolyte according to claim 3, wherein based on the total mass of the organic solvent, the carboxylic acid ester has a mass percentage of 5% to 50%.

9. A battery comprising a positive electrode plate, a negative electrode plate, a separator disposed between the positive electrode plate and the negative electrode plate, and an electrolyte, wherein the electrolyte is the electrolyte according to claim 1.

\* \* \* \* \*